(12) United States Patent
Mahaffey, Jr. et al.

(10) Patent No.: US 8,962,815 B2
(45) Date of Patent: *Feb. 24, 2015

(54) BIS-AZO COLORANTS FOR USE AS BLUING AGENTS

(71) Applicant: Milliken & Company, Spartanburg, SC (US)

(72) Inventors: Robert L Mahaffey, Jr., Spartanburg, SC (US); Xiaoyong Michael Hong, Greer, SC (US); Eduardo Torres, Boiling Springs, SC (US); Dominick J Valenti, Greenville, SC (US); Gregory Scot Miracle, Hamilton, OH (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/748,799

(22) Filed: Jan. 24, 2013

(65) Prior Publication Data

US 2013/0211058 A1  Aug. 15, 2013

Related U.S. Application Data

(63) Continuation of application No. 12/910,104, filed on Oct. 22, 2010, now Pat. No. 8,378,083.

(51) Int. Cl.
*C09B 35/37* (2006.01)
*C09B 35/037* (2006.01)
*C09B 31/072* (2006.01)
*C11D 3/42* (2006.01)
*C11D 7/34* (2006.01)

(52) U.S. Cl.
CPC ............ *C09B 35/037* (2013.01); *C09B 31/072* (2013.01); *C11D 3/42* (2013.01); *C11D 7/34* (2013.01)
USPC ........... 534/836; 534/832; 534/829; 534/831; 534/828; 534/827; 534/834

(58) Field of Classification Search
USPC ................................. 534/816–837
See application file for complete search history.

(56) References Cited

U.S. PATENT DOCUMENTS

| 1,947,027 | A | 2/1934 | Woodward | 260/83 |
|---|---|---|---|---|
| 3,496,162 | A | 2/1970 | Groebke et al. | 260/187 |
| 3,725,384 | A | 4/1973 | Zickendraht et al. | 260/186 |
| 5,211,719 | A | 5/1993 | Kaser | 8/527 |
| 6,736,888 | B1 * | 5/2004 | James | 106/31.46 |
| 6,746,525 | B1 * | 6/2004 | James | 106/31.52 |
| 7,674,757 | B2 | 3/2010 | Torres et al. | 510/392 |
| 8,378,083 | B2 | 2/2013 | Mahaffey, Jr. et al. | 534/729 |
| 2007/0190269 | A1 | 8/2007 | Cheng | 428/1.31 |

FOREIGN PATENT DOCUMENTS

| DE | 11 53 476 | | 8/1963 | |
|---|---|---|---|---|
| GB | 2 036 779 | | 7/1980 | |
| JP | 58191772 | A * | 11/1983 | |
| JP | 3090487 | B2 * | 9/2000 | |
| WO | 2005/040286 | | 5/2005 | |
| WO | 2008/007318 | | 1/2008 | 3/386 |
| WO | 2009/047128 | | 4/2009 | |

OTHER PUBLICATIONS

Cerniani, A. et al. Disazo acid dyes for wool. Bolletino Scientifico della Facolta di Chimica 1969, 27(4), 305-312.*
Koichi, T. JP 3090487 B2, published Sep. 18, 2000, English Machine Translation.*
Takeshi et al. "Recording Liquid" JP 58191772 A (Nov. 9, 1983)—English Translation, obtained from Phoenix Translations via the USPTO May 2014.*
Takeshi et al. "Recording Liquid" JP 58191772 A (Nov. 9, 1983)—Abstract (Engl. Transl.), retrieved from CAS STN database May 2014.*
International Search Report. PCT/US2010/053716 date of mailing Apr. 19, 2011.

* cited by examiner

*Primary Examiner* — Joseph Kosack
*Assistant Examiner* — Amanda L Aguirre
(74) *Attorney, Agent, or Firm* — Brenda D. Wentz

(57) ABSTRACT

This invention relates to bis-azo colorants for use as bluing agents, laundry care compositions comprising bis-azo colorants that may serve as bluing agents, processes for making such bluing agents and laundry care compositions and methods of using the same. The bluing agents are generally comprised of at least two components: at least one chromophore component and at least one polymeric component. These bluing agents are advantageous in providing a whitening effect to fabrics, while not building up over time and causing undesirable blue discoloration to the treated fabrics.

5 Claims, No Drawings

BIS-AZO COLORANTS FOR USE AS BLUING AGENTS

CROSS-REFERENCE TO RELATED APPLICATION

This application claims priority to and is a continuation of U.S. patent application Ser. No. 12/910,104, entitled "Bis-Azo Colorants for Use as Bluing Agents," which was filed on Oct. 22, 2010, and is entirely incorporated by reference herein.

TECHNICAL FIELD

This invention relates to bis-azo colorants for use as bluing agents, laundry care compositions comprising bis-azo colorants that may serve as bluing agents, processes for making such bluing agents and laundry care compositions and methods of using the same. The bluing agents are generally comprised of at least two components: at least one chromophore component and at least one polymeric component. These bluing agents are advantageous in providing a whitening effect to fabrics, while not building up over time and causing undesirable blue discoloration to the treated fabrics.

BACKGROUND

As textile substrates age, their color tends to fade or yellow due to exposure to light, air, soil, and natural degradation of the fibers that comprise the substrates. Thus, the purpose of bluing agents is generally to visually brighten these textile substrates and counteract the fading and yellowing of the substrates. Typically, bluing agents may be found in laundry detergents, fabric softeners, or rinse aids and are therefore applied to textile substrates during the laundering process. However, it is important that bluing agents function to brighten treated textile substrates without causing undesirable staining of the textile substrates. Cellulosic substrates, in particular, tend to exhibit a yellow hue after exposure to light, air, and/or soiling. This yellowness is often difficult to reverse by normal laundering procedures. As a result, there exists a need for improved bluing agents which are capable of eliminating the yellowness exhibited by ageing cellulosic substrates. By utilizing such improved bluing agents, the life of the textile substrates, such as clothing articles, table linens, etc., may be extended. Unfortunately, current bluing agents either do not provide a hueing benefit after a single treatment cycle and/or they build up to an undesirable level, thus over-hueing the treated situs over multiple treatment cycles.

The present invention offers advantages over previous efforts in this area, as this invention takes advantage of compounds having a non-sulfonic acid substituent in the terminal phenyl ring of the bis-azo structure. Sulfonic acid groups are known to promote the deposition and staining of acid dyes on cellulosic fabrics. These groups are also essential for the solubility and compatibility of the dyes in laundry formulations. While it is necessary that bluing agents deposit from wash water, it is undesirable that they stain the fabric by inadvertent contact or by building up over time, i.e. overhueing. Applicants recognized that modification or replacement of the sulfonic acid group at the phenyl terminal end of the bis-azo with a nonionic solubilizing group allows for good deposition of the bis-azo but attenuates its staining and overhueing tendencies and still allows the bluing agent to be compatible in laundry formulations. In short, Applicants recognized the source of the current hueing deficiencies and herein provide the solution to such problem. The hueing compounds disclosed herein also absorb light at a wavelength appropriate to neutralize the yellowness of cellulosic substrates. These compounds function ideally as bluing agents for cellulosic substrates and may be incorporated into laundry care compositions for use by consumers.

SUMMARY OF INVENTION

This invention relates to laundry care compositions comprising bis-azo colorants that may serve as bluing agents, processes for making such laundry care compositions and methods of using the same. The bluing agents are generally comprised of at least two components: at least one chromophore component and at least one polymeric component. These bluing agents are advantageous in providing a whitening effect to fabrics, while not building up over time and causing undesirable blue discoloration to the treated fabrics.

In one aspect of the invention, the bluing agent comprises (a) at least one chromophore component that comprises a bis-azo colorant, and (b) at least one polymeric component or substituted sulfonamide component; wherein the bluing agent has the following structure:

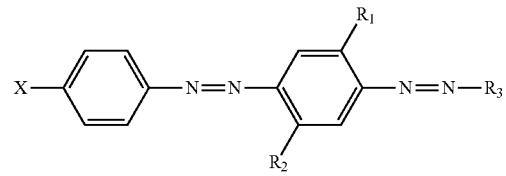

wherein:
- $R_1$ and $R_2$ are independently H, alkyl, alkoxy, alkyleneoxy, alkyl capped alkyleneoxy, polyalkyleneoxy, alkyl capped polyalkyleneoxy, urea, or amido;
- $R_3$ is an aryl group substituent that may be a substituted phenyl or napthyl moiety;
- X is a substituted oxygen, a substituted or unsubstituted amino, or a substituted or unsubstituted sulfonamide group wherein the substituents are selected from the group consisting of alkyl, alkyleneoxy, polyalkyleneoxy, or phenyl moieties wherein the phenyl group may be further substituted with alkyl, alkyleneoxy or polyalkyleneoxy moieties.

In another aspect of the invention, the bluing agent has the following structure:

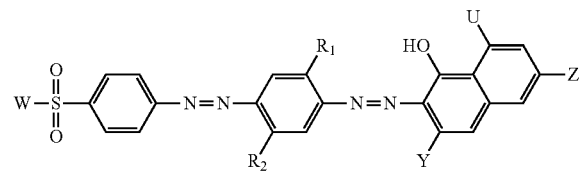

wherein:
- $R_1$ and $R_2$ are independently H, alkyl, alkoxy, alkyleneoxy, alkyl capped alkyleneoxy, polyalkyleneoxy, alkyl capped polyalkyleneoxy, or amido;
- W is a substituted amino moiety;
- U is a hydrogen, an amino group or an amino group substituted with an acyl group;
- Y is a hydrogen or a sulfonic acid moiety; and
- Z is a sulfonic acid moiety or an amino group substituted with a phenyl group.

In yet another aspect of the invention, $R_1$ is alkoxy and $R_2$ is alkyl.

DETAILED DESCRIPTION

As used herein, the term "alkoxy" is intended to include $C_1$-$C_6$ alkoxy and alkoxy derivatives of polyols having repeating units such as butylene oxide, glycidol oxide, ethylene oxide or propylene oxide.

As used herein, the terms "alkyl" and "alkyl capped" are intended to include $C_1$-$C_6$ alkyl groups.

The terms "ethylene oxide," "propylene oxide" and "butylene oxide" shown herein by their typical designation of "EO," "PO" and "BO," respectively.

As used herein, the term "laundry care composition" includes, unless otherwise indicated, granular, powder, liquid, gel, paste, unit dose bar form and/or flake type washing agents and/or fabric treatment compositions.

As used herein, the term "fabric treatment composition" includes, unless otherwise indicated, fabric softening compositions, fabric enhancing compositions, fabric freshening compositions and combinations there of. Such compositions may be, but need not be rinse added compositions.

As used herein, "cellulosic substrates" are intended to include any substrate which comprises at least a majority by weight of cellulose. Cellulose may be found in wood, cotton, linen, jute, and hemp. Cellulosic substrates may be in the form of powders, fibers, pulp and articles formed from powders, fibers and pulp. Cellulosic fibers, include, without limitation, cotton, rayon (regenerated cellulose), acetate (cellulose acetate), triacetate (cellulose triacetate), and mixtures thereof. Articles formed from cellulosic fibers include textile articles such as fabrics. Articles formed from pulp include paper.

As used herein, the articles including "the", "a" and "an" when used in a claim, are understood to mean one or more of what is claimed or described.

As used herein, the terms "include", "includes" and "including" are meant to be non-limiting.

The test methods disclosed in the Test Methods Section of the present application should be used to determine the respective values of the parameters of Applicants' inventions.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited are, in relevant part, incorporated herein by reference; the citation of any document is not to be construed as an admission that it is prior art with respect to the present invention.

Suitable Bluing Agents

The bluing agents employed in the present laundry care compositions may be dyes, pigments, or polymeric colorants comprising a chromophore constituent and a polymeric constituent. The chromophore constituent is characterized in that it absorbs light in the wavelength range of blue, red, violet, purple, or combinations thereof upon exposure to light. In one aspect, the chromophore constituent exhibits an absorbance spectrum maximum from about 520 nanometers to about 640 nanometers in water and/or methanol, and in another aspect, from about 560 nanometers to about 610 nanometers in water and/or methanol.

Examples of suitable polymeric constituents include polyoxyalkylene chains having multiple repeating units. In one aspect, the polymeric constituents include polyoxyalkylene chains having from 2 to about 30 repeating units, from 2 to about 20 repeating units, from 2 to about 10 repeating units or even from about 3 or 4 to about 6 repeating units. Non-limiting examples of polyoxyalkylene chains include ethylene oxide, propylene oxide, glycidol oxide, butylene oxide and mixtures thereof.

In one aspect, the bluing agent employed in the present laundry care compositions may be characterized by the following general Structure (I):

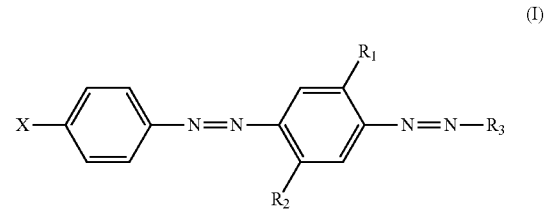

(I)

wherein:
$R_1$ and $R_2$ are independently H, alkyl, alkoxy, alkyleneoxy, alkyl capped alkyleneoxy, polyalkyleneoxy, alkyl capped polyalkyleneoxy, urea, or amido;
$R_3$ is an aryl group substituent that may be a substituted phenyl or napthyl moiety;
X is a substituted oxygen, a substituted or unsubstituted amino, or a substituted or unsubstituted sulfonamide group wherein the substituents are selected from the group consisting of alkyl, alkyleneoxy, polyalkyleneoxy, or phenyl moieties wherein the phenyl group may be further substituted with alkyl, alkyleneoxy or polyalkyleneoxy moieties.

In another aspect, suitable bluing agents may be characterized by the following general Structure (II):

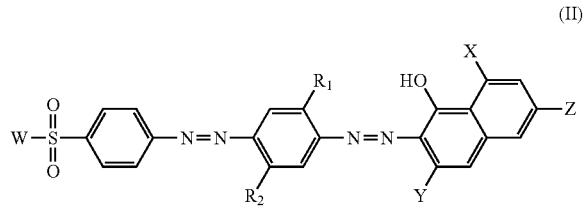

(II)

wherein:
$R_1$ and $R_2$ are independently H, alkyl, alkoxy, alkyleneoxy, alkyl capped alkyleneoxy, polyalkyleneoxy, alkyl capped polyalkyleneoxy, or amido;

W is a substituted amino moiety;

X is a hydrogen, an amino group or an amino group substituted with an acyl group;

Y is a hydrogen or a sulfonic acid moiety; and

Z is a sulfonic acid moiety or an amino group substituted with a phenyl group.

In further aspects, suitable bluing agents may be characterized by the following general Structure (III):

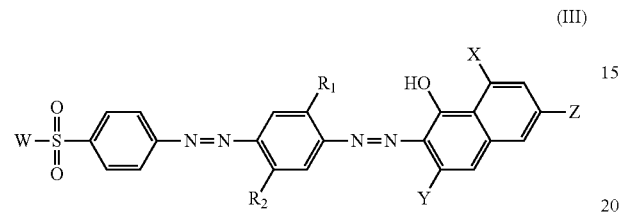

(III)

wherein:

$R_1$ is alkoxy;

$R_2$ is alkyl;

W is a substituted amino moiety;

X is a hydrogen, an amino group or an amino group substituted with an acyl group;

Y is a hydrogen or a sulfonic acid moiety; and

Z is a sulfonic acid moiety or an amino group substituted with a phenyl group.

In one aspect of the invention, suitable bluing agents include, but are not limited to the following structures:

(Example 14)

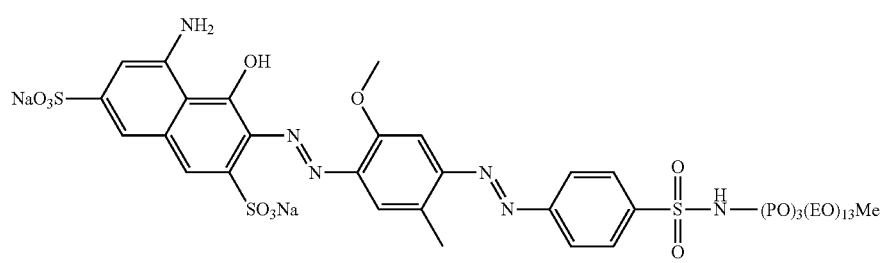

Formula BA1

(Example 9)

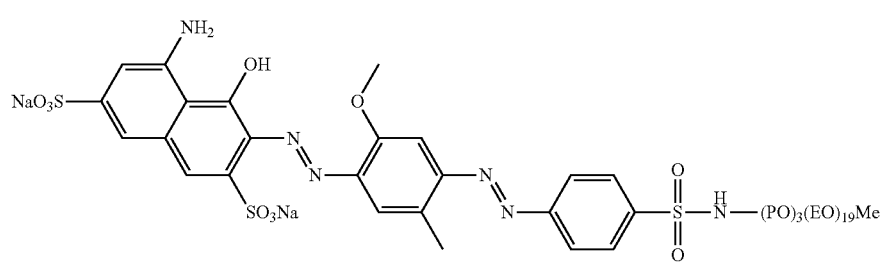

Formula BA2

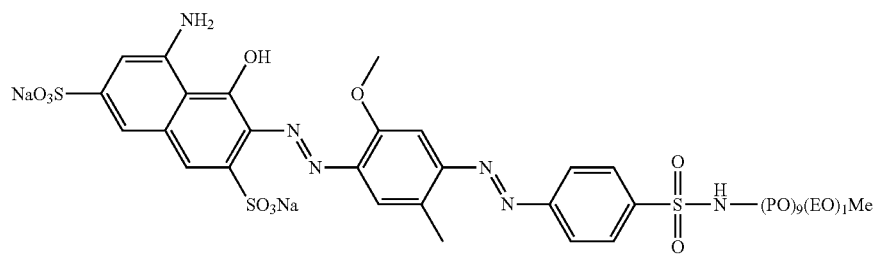

Formula BA3

-continued
(Example 1)
Formula BA4
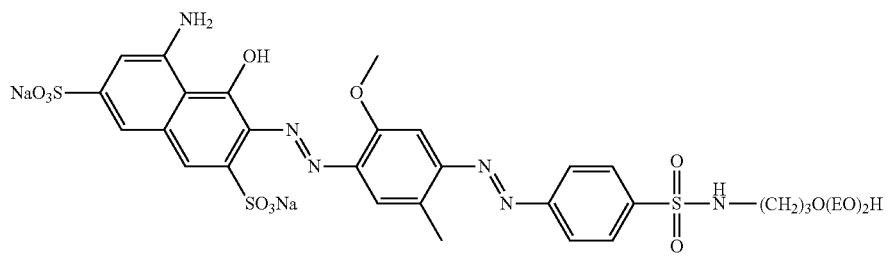
(Example 6)
Formula BA5
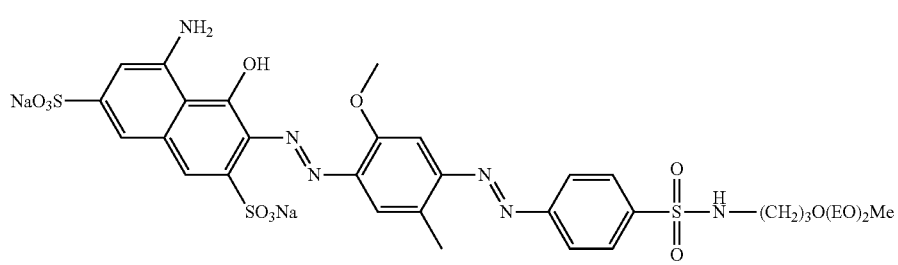
Formula BA6
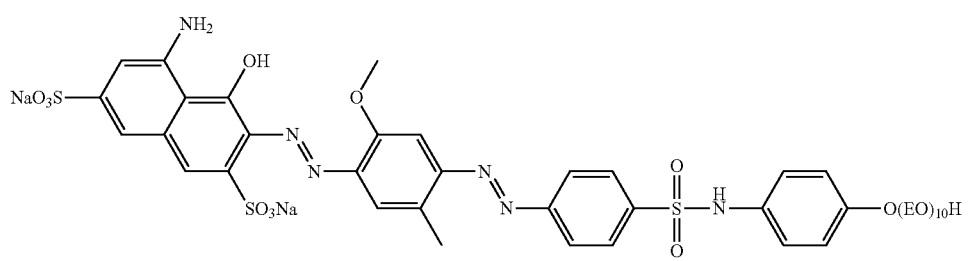
(Example 19)
Formula BA7
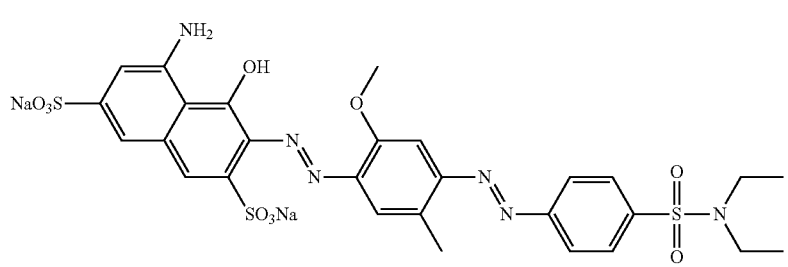
Formula BA8
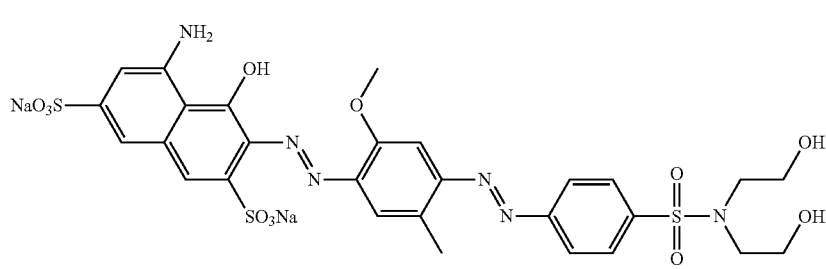

-continued
Formula BA9
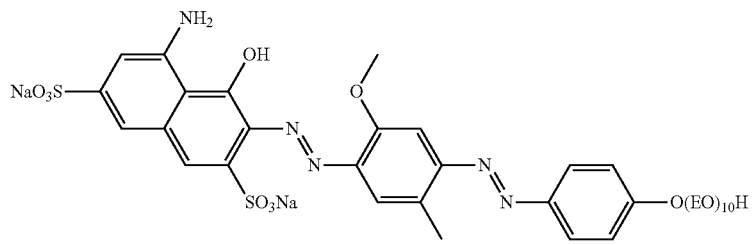
Formula BA10
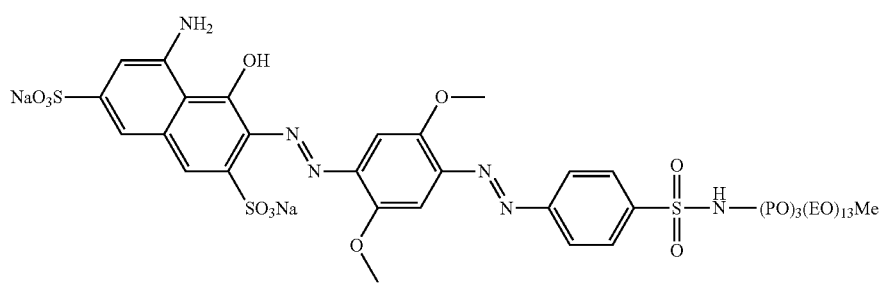
(Example 10)
Formula BA11
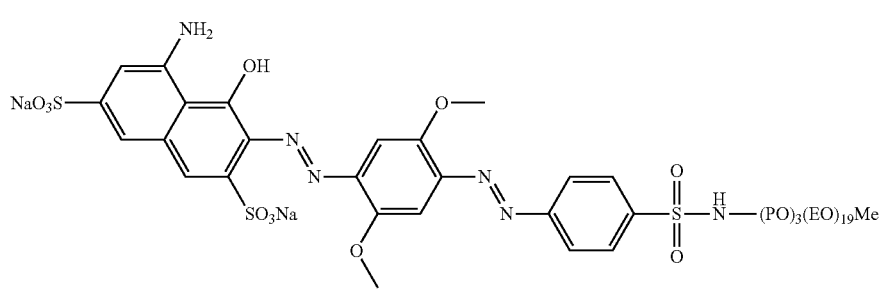
(Example 8)
Formula BA12
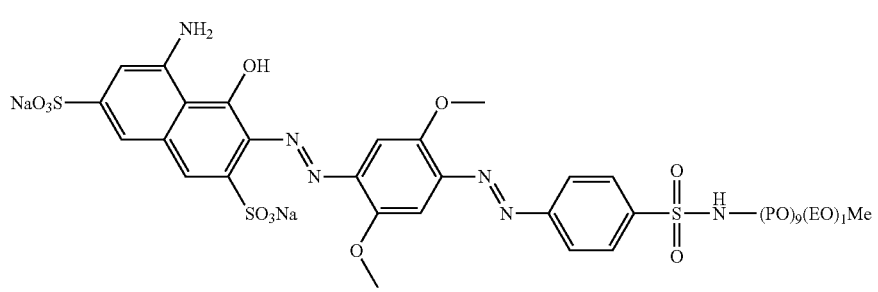
(Example 2)
Formula BA13
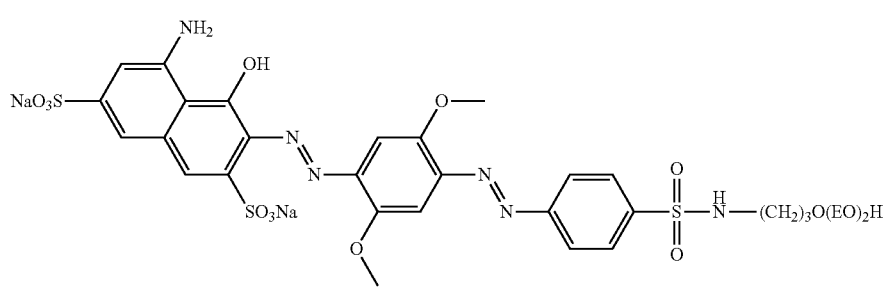

-continued
(Example 7)
Formula BA14
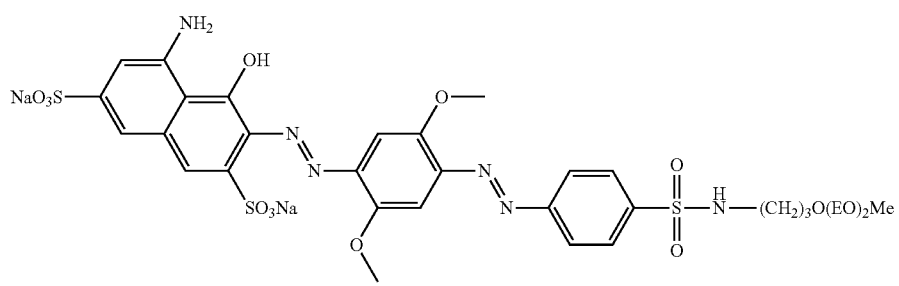
(Example 12)
Formula BA15
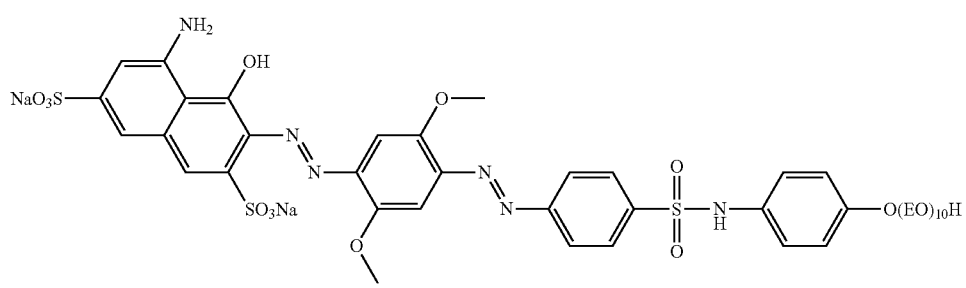
Formula BA16
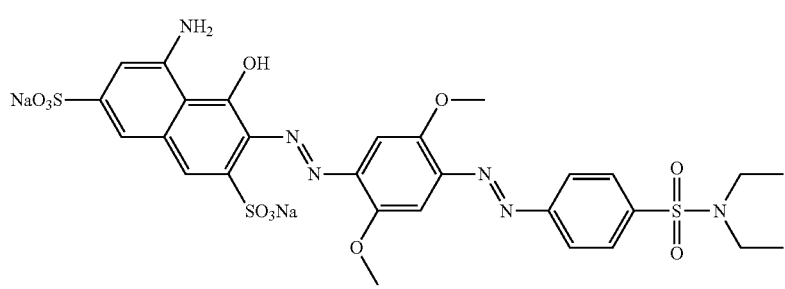
(Example 13)
Formula BA17
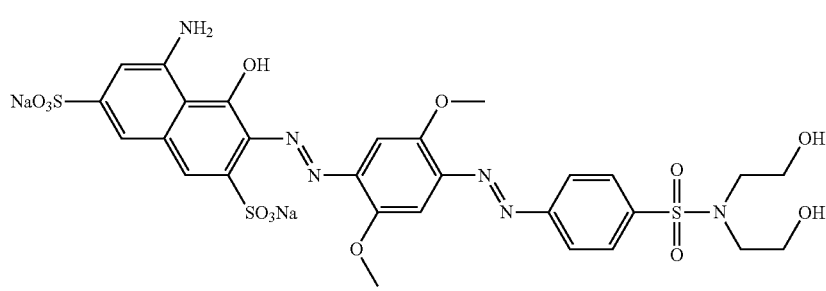
(Example 11)
Formula BA18
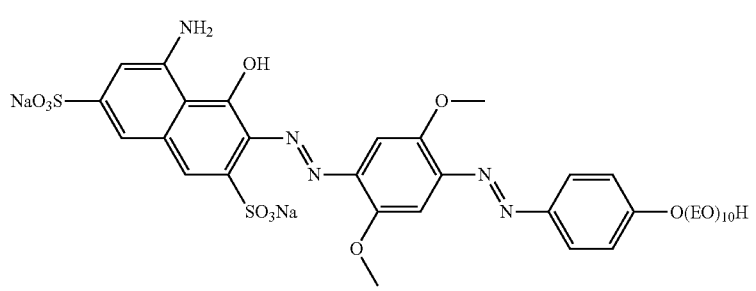

-continued
Formula BA19
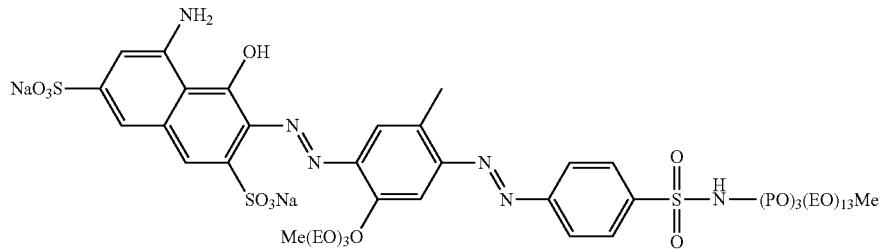
Formula BA20
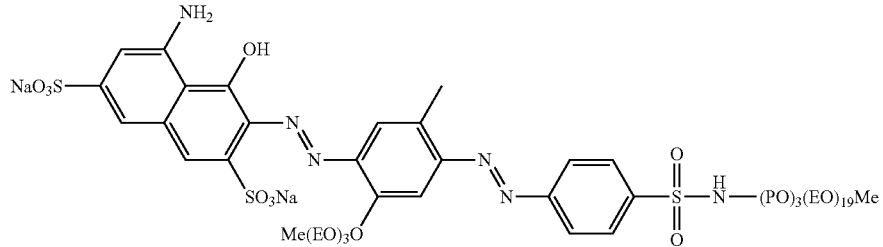
Formula BA21
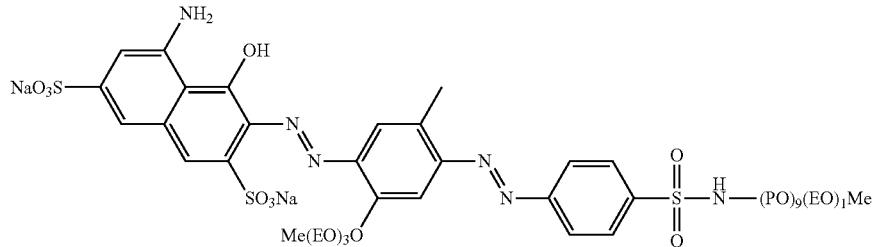
Formula BA22
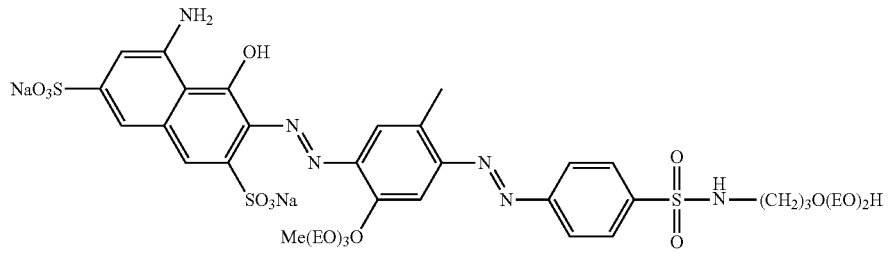
Formula BA23
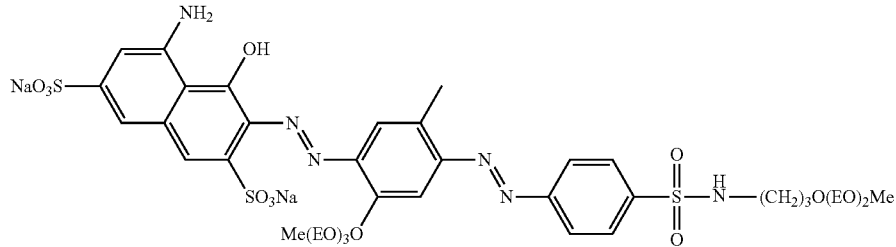
Formula BA24
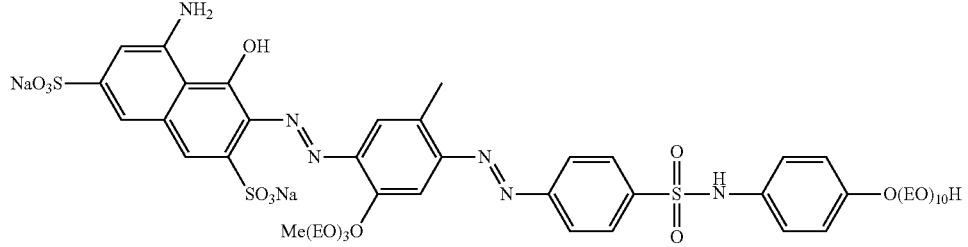

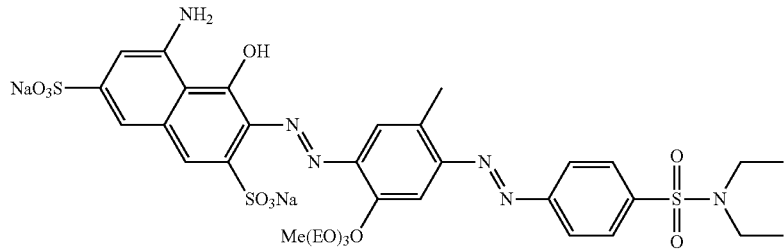
Formula BA25
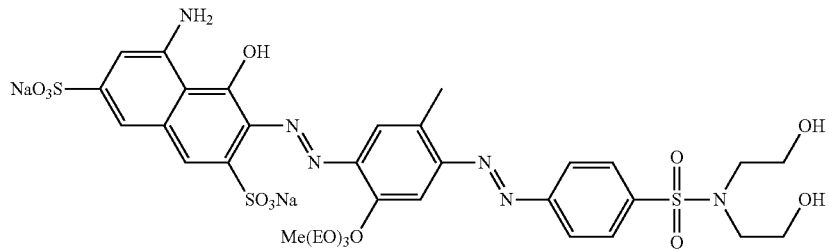
Formula BA26
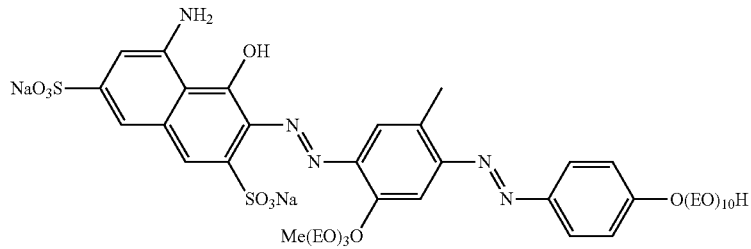
Formula BA27
(Example 15)
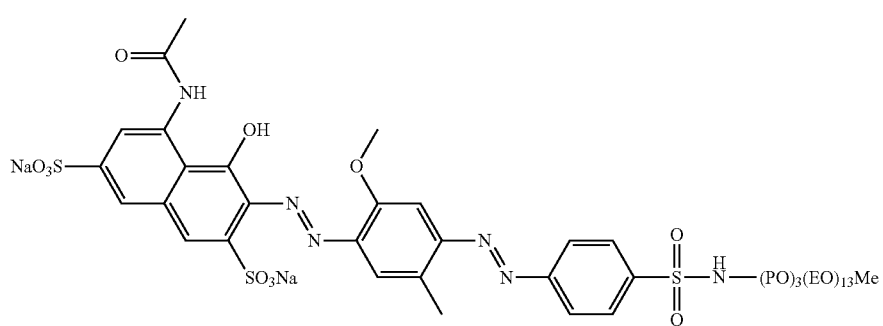
Formula BA28
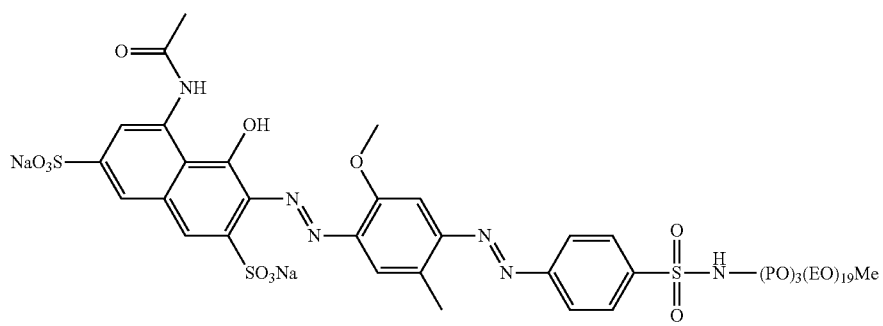
Formula BA29

Formula BA30
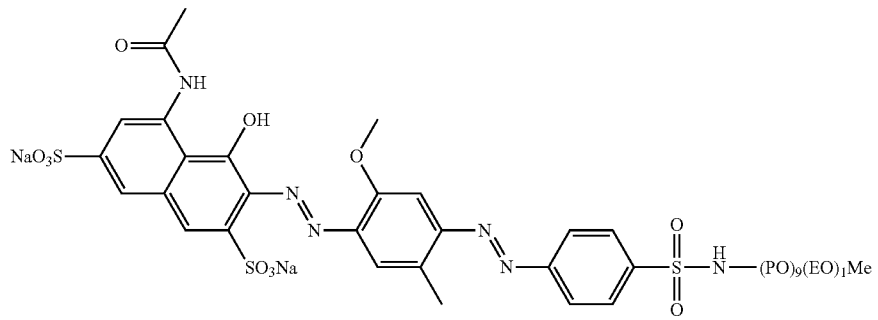
(Example 3)
Formula BA31
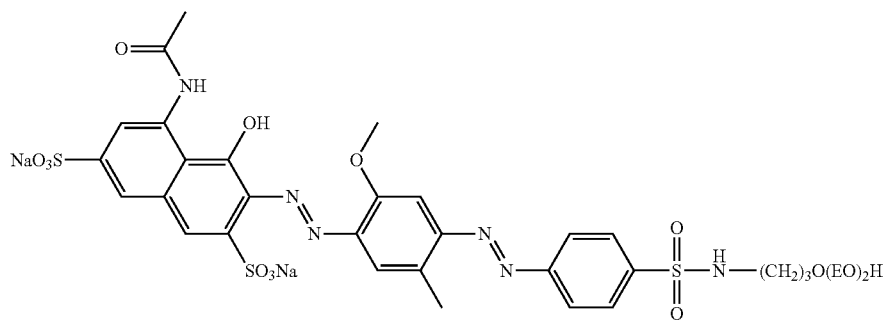
Formula BA32
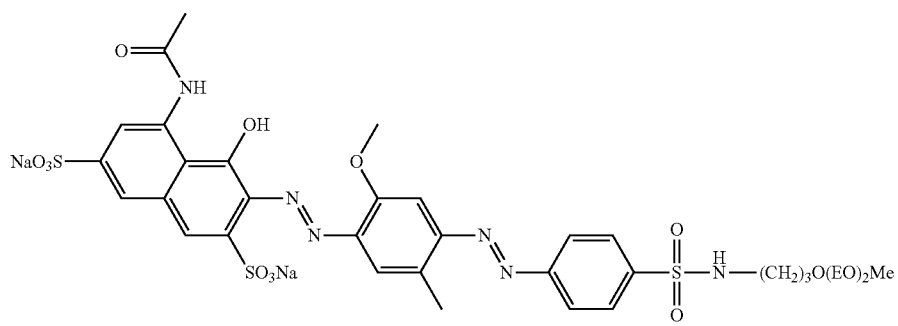
Formula BA33
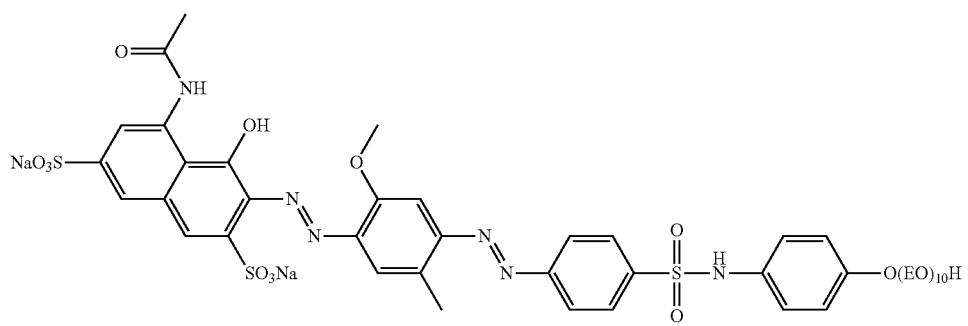

-continued
(Example 17)
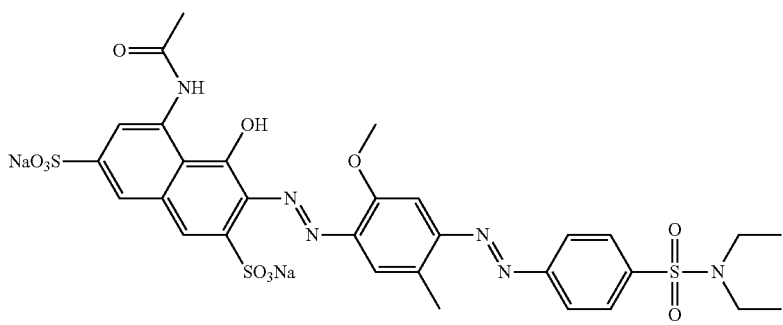
Formula BA34
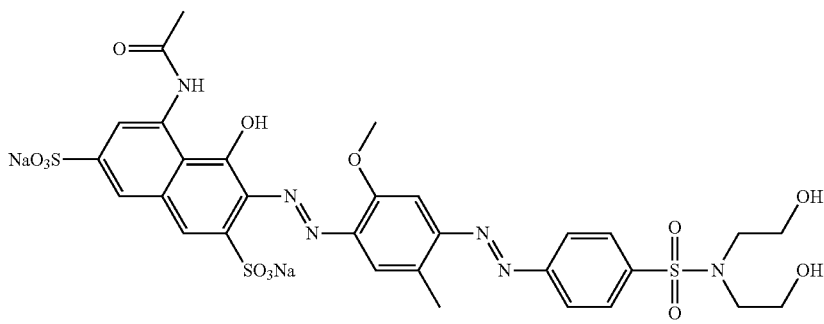
Formula BA35
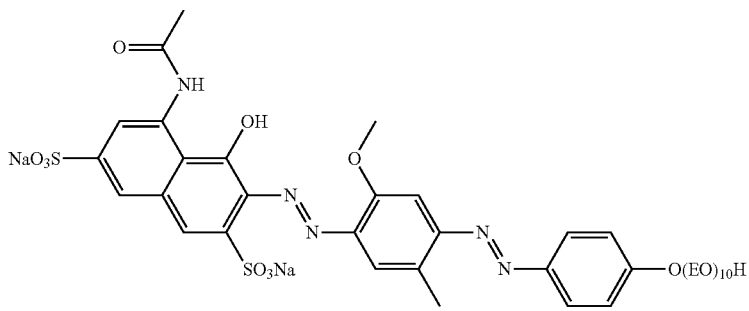
Formula BA36
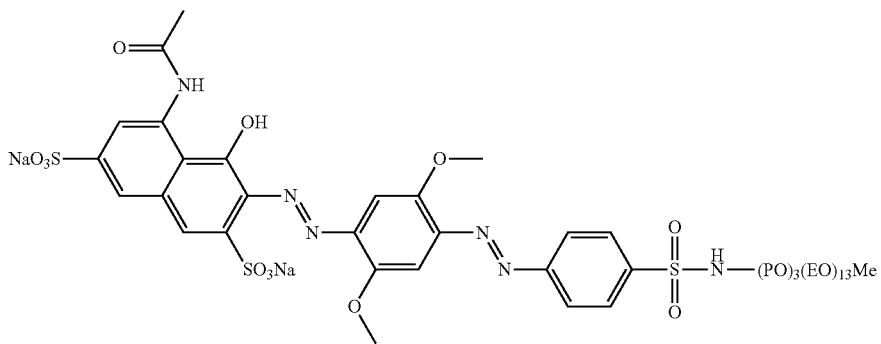
Formula BA37

-continued
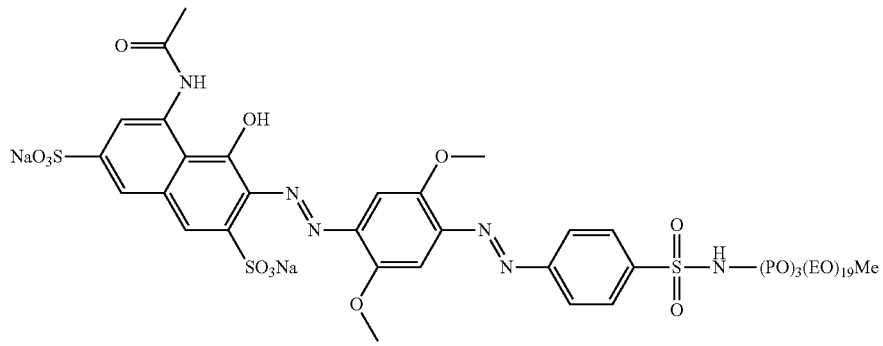
Formula BA38
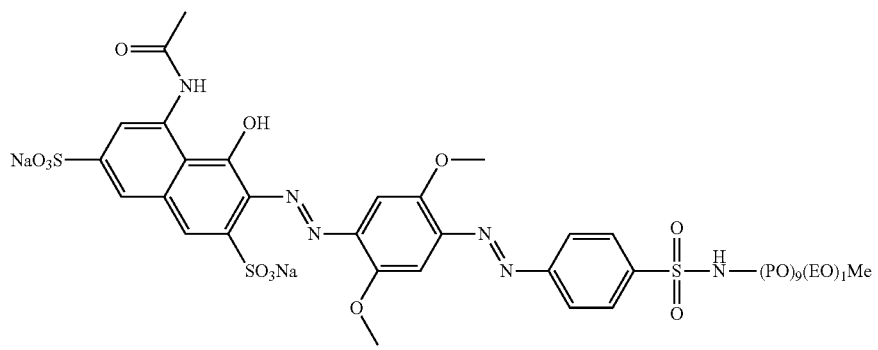
Formula BA39
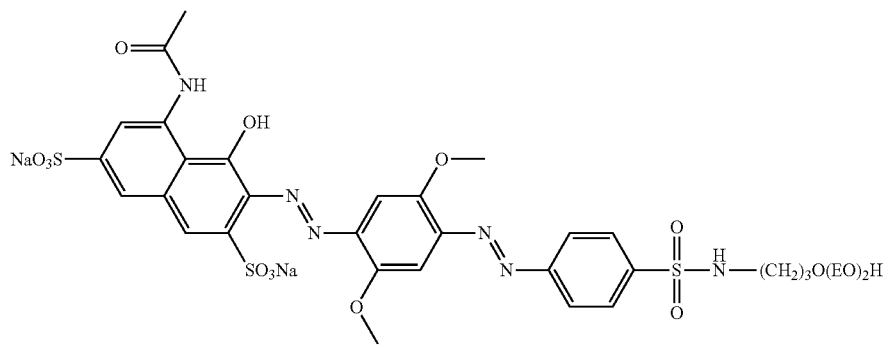
Formula BA40
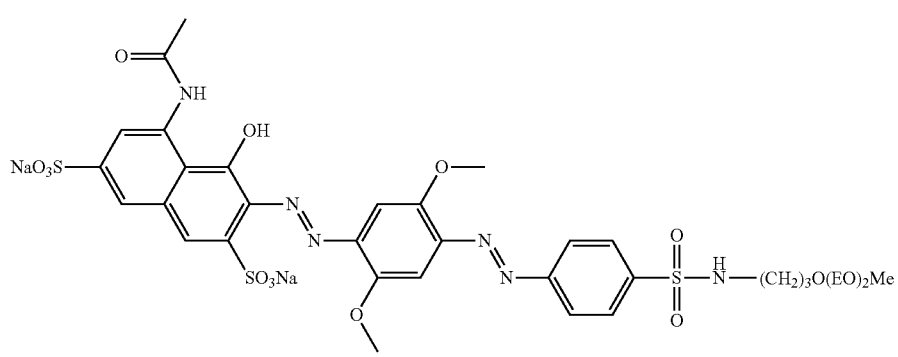
Formula BA41

-continued
Formula BA42
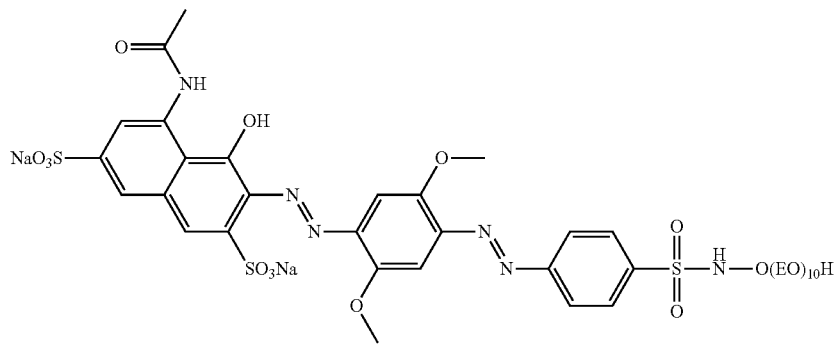
Formula BA43
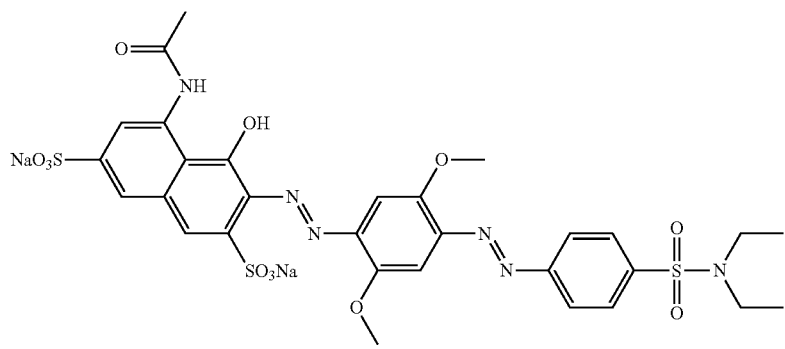
Formula BA44
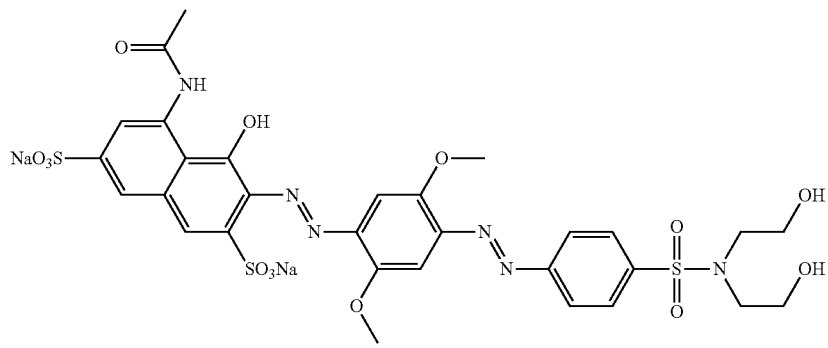
Formula BA45
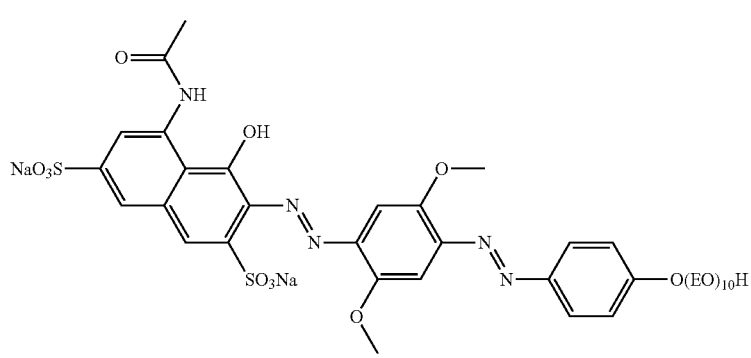

-continued
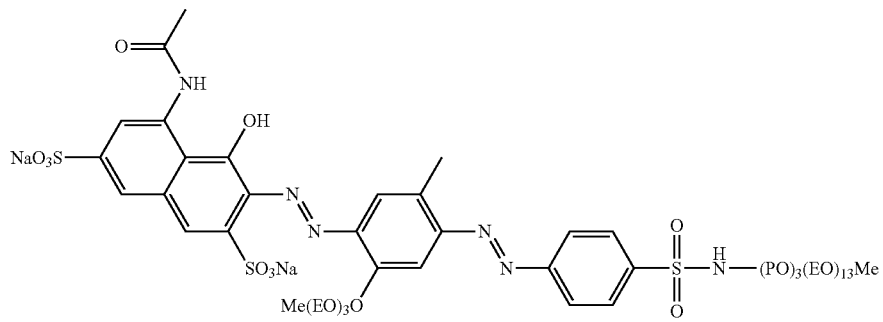
Formula BA46
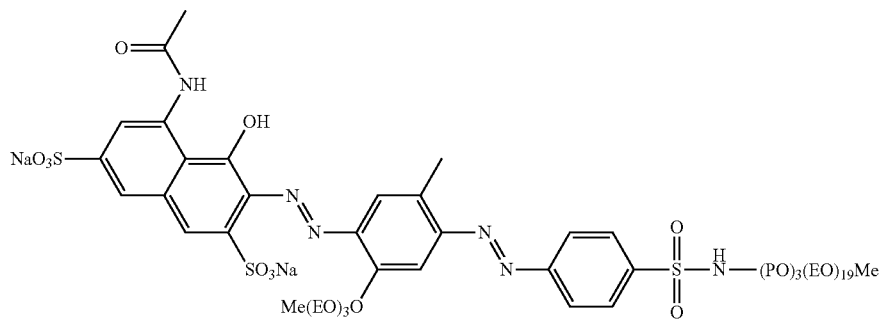
Formula BA47
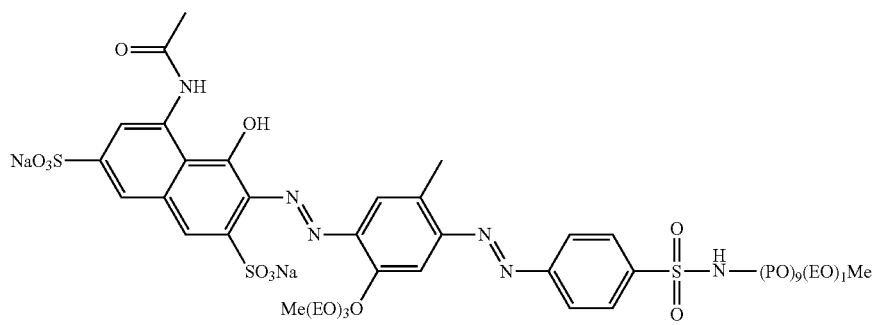
Formula BA48
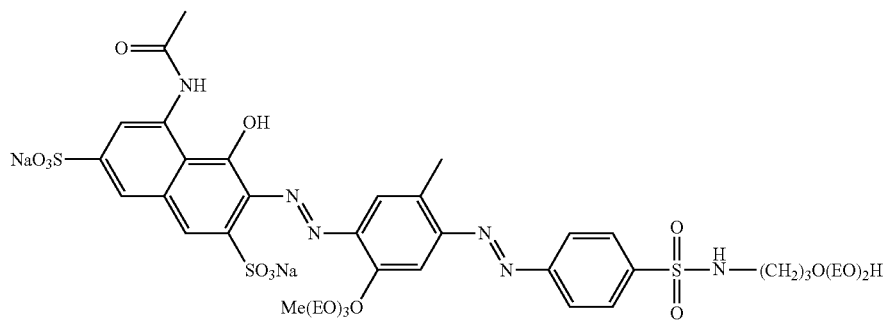
Formula BA49
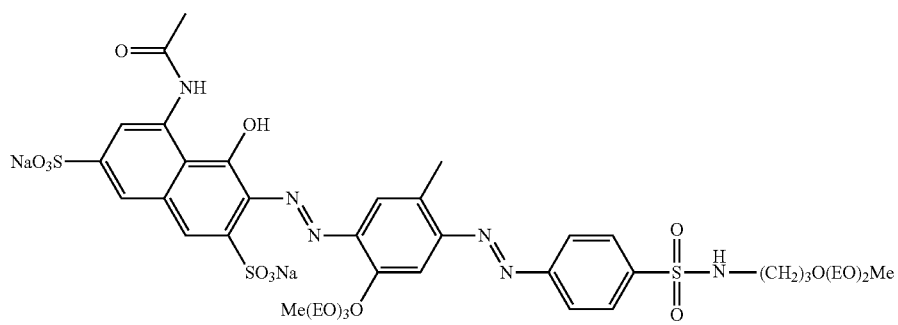
Formula BA50

Formula BA51
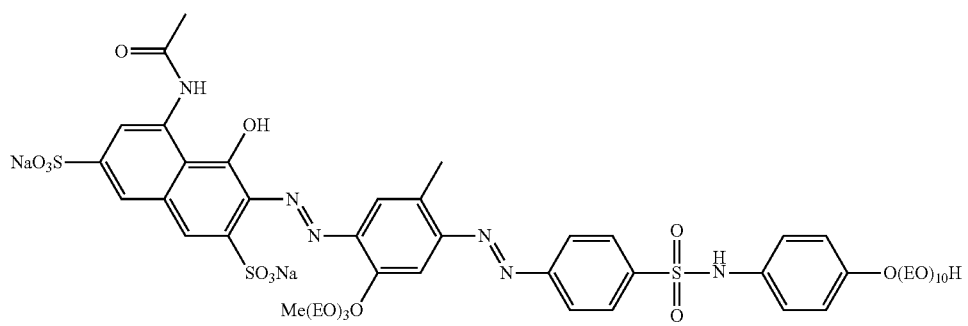
Formula BA52
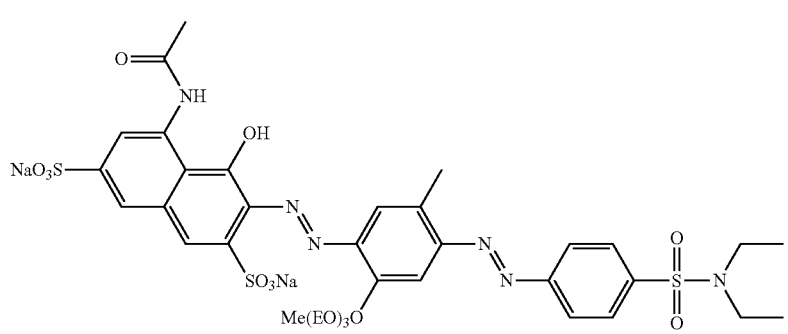
Formula BA53
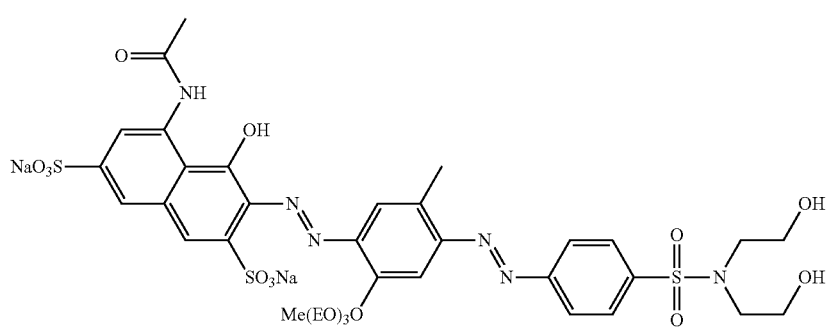
Formula BA54
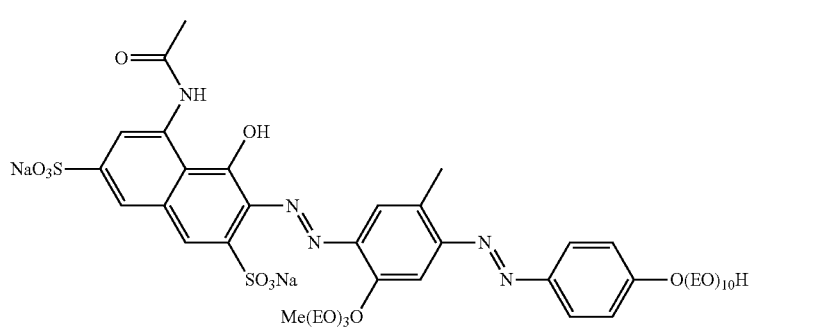
(Example 16)
Formula BA55
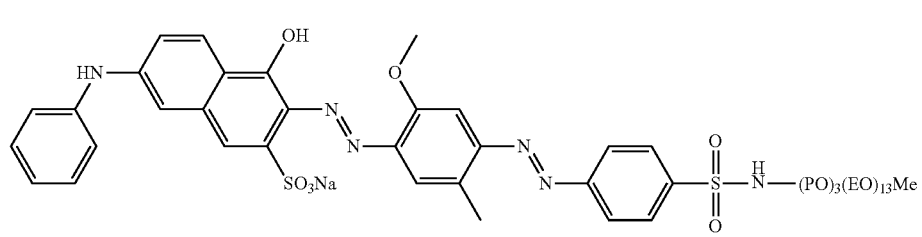

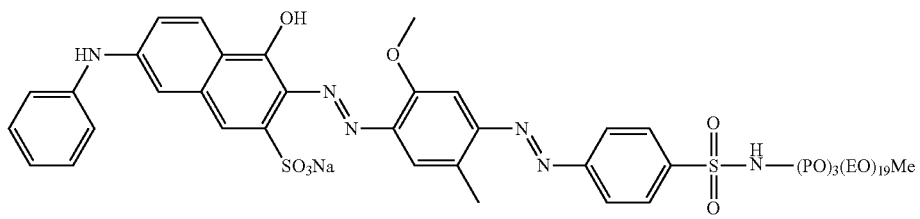
Formula BA56
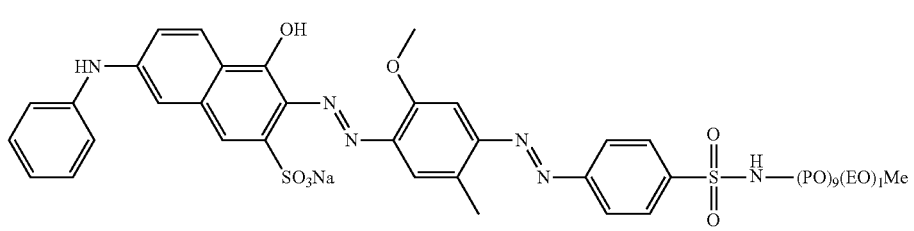
Formula BA57
(Example 4)
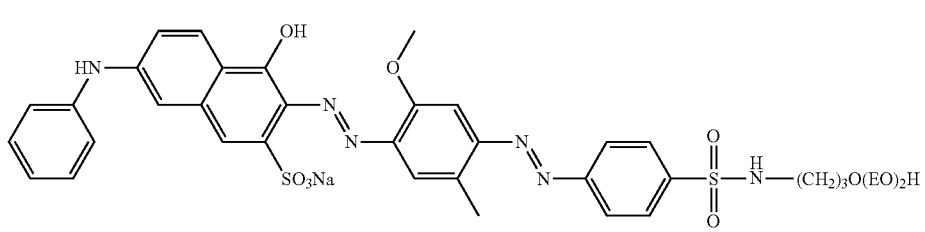
Formula BA58
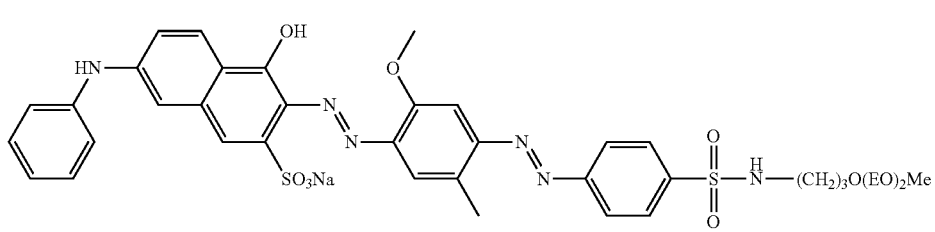
Formula BA59
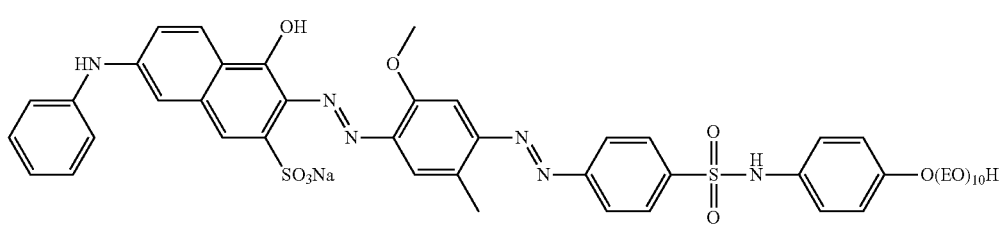
Formula BA60
(Example 18)
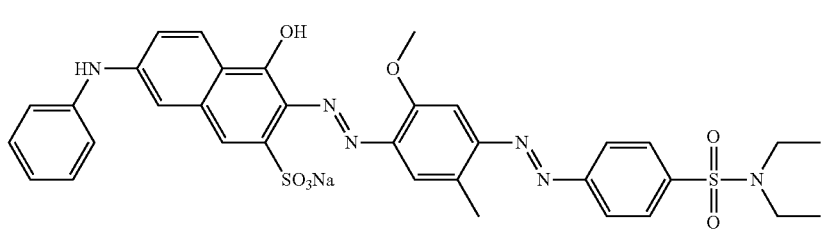
Formula BA61

-continued
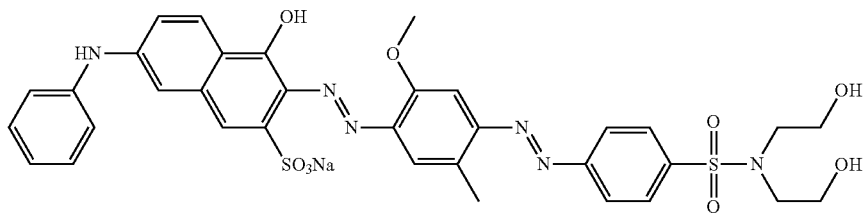
Formula BA62
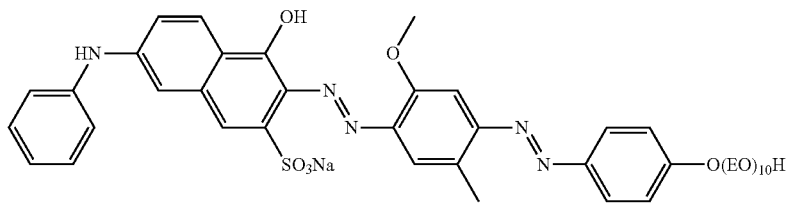
Formula BA63
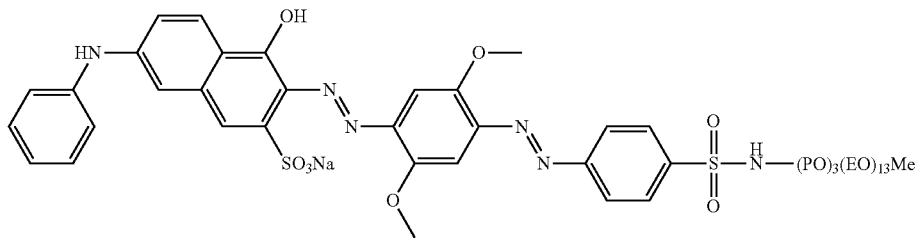
Formula BA64
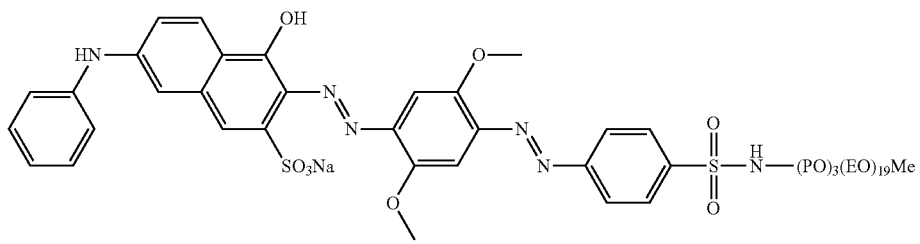
Formula BA65
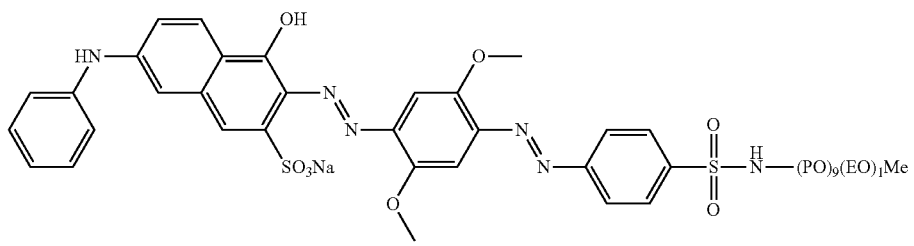
Formula BA66
(Example 5)
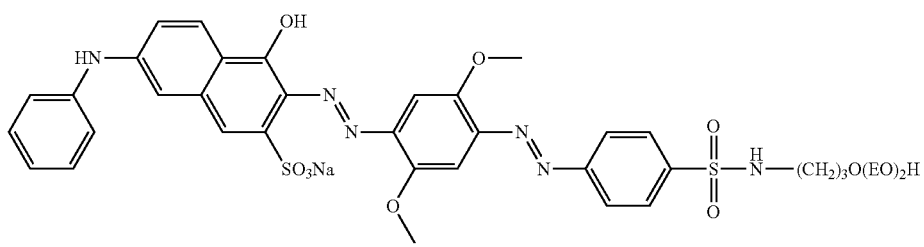
Formula BA67

-continued
Formula BA68
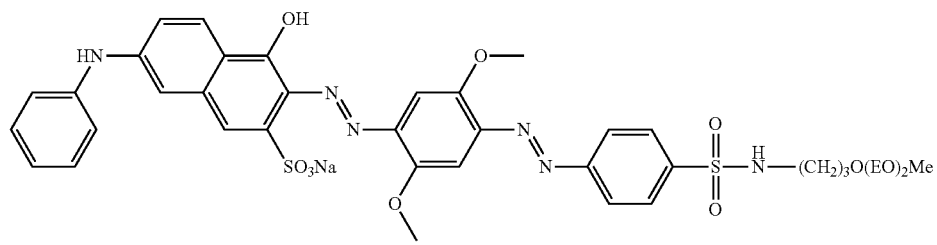
Formula BA69
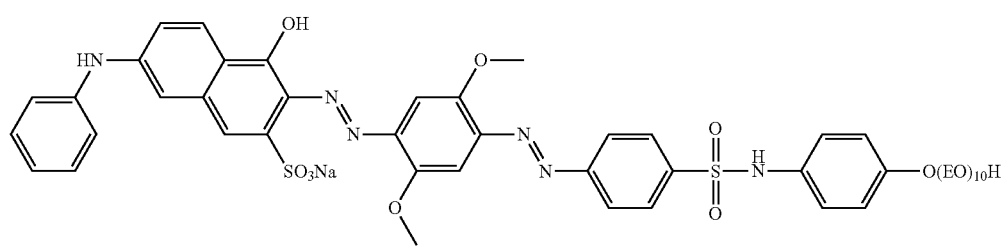
Formula BA70
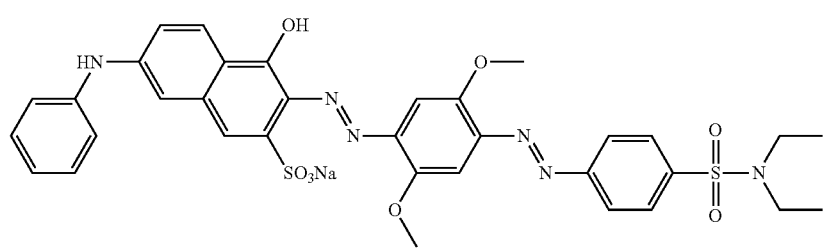
Formula BA71
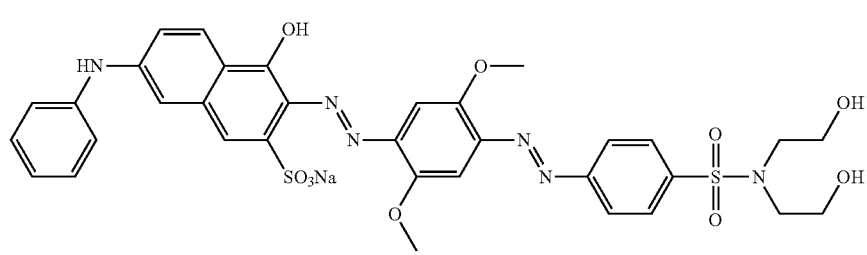
Formula BA72
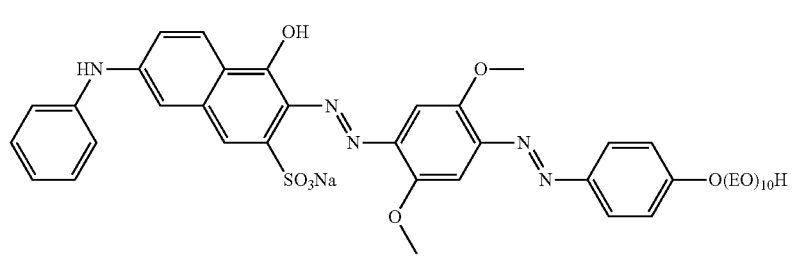
Formula BA73
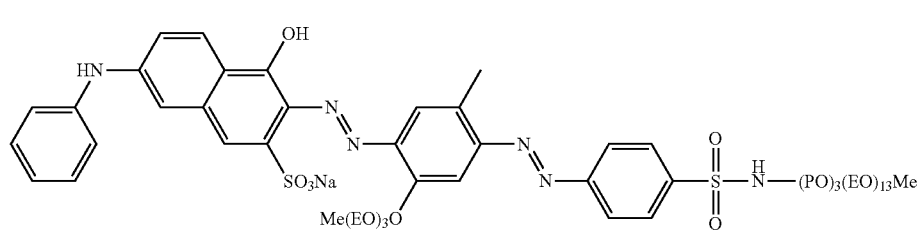

-continued
Formula BA74
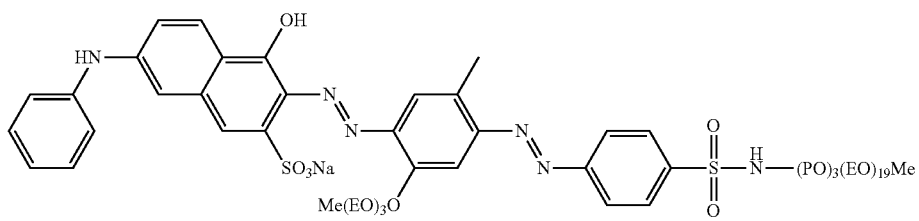
Formula BA75
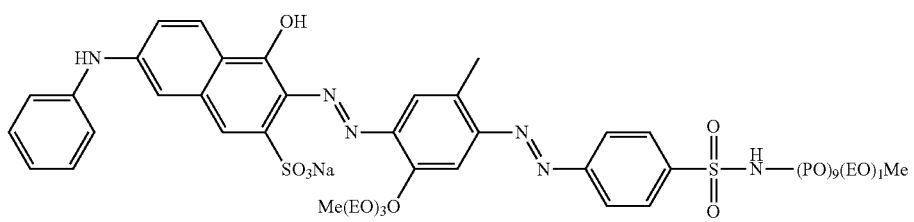
Formula BA76
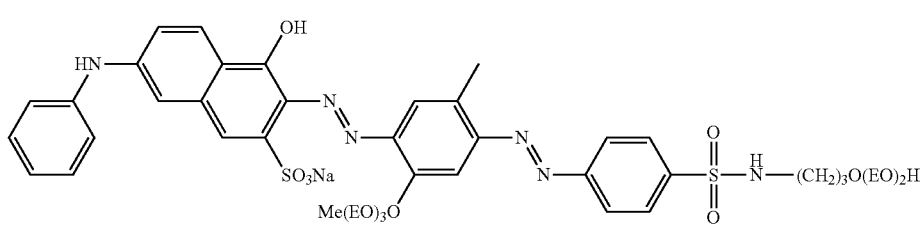
Formula BA77
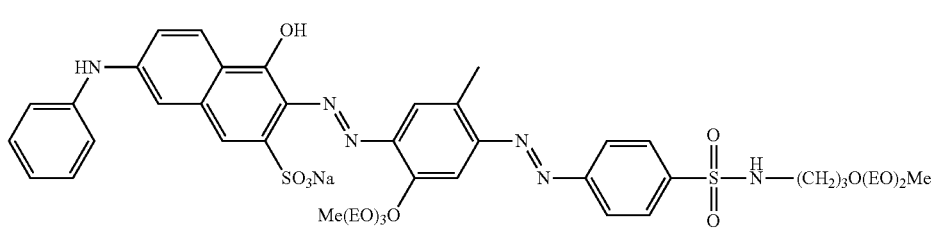
Formula BA78
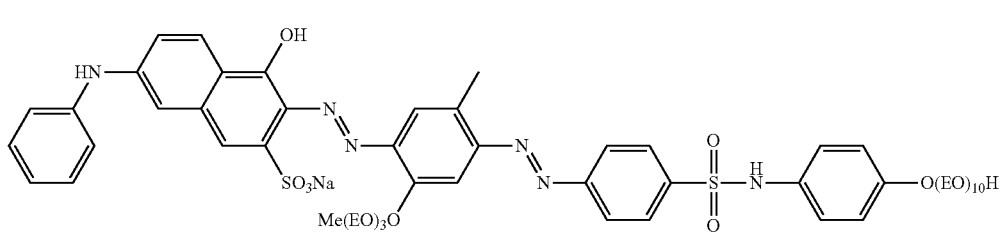
Formula BA79
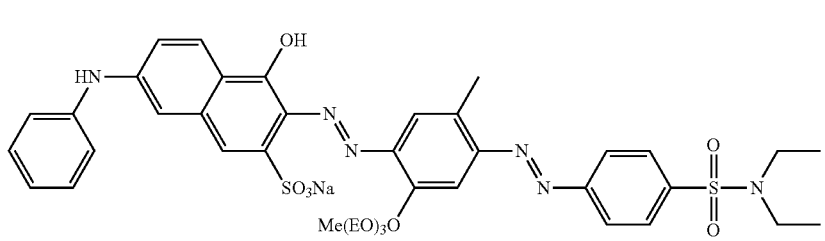
Formula BA80
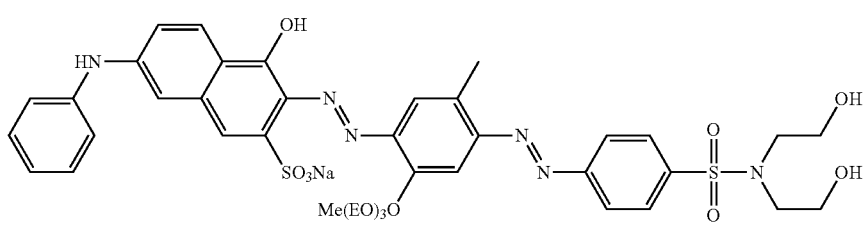

Formula BA81

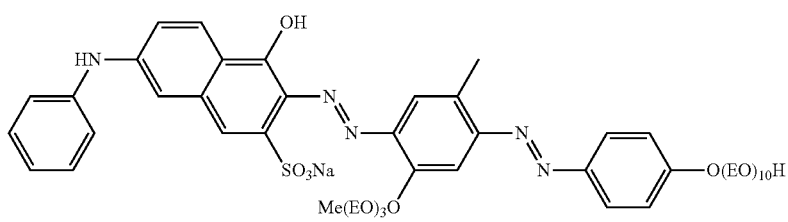

A suitable synthesis route for certain bis-azo colorants disclosed herein is shown below:

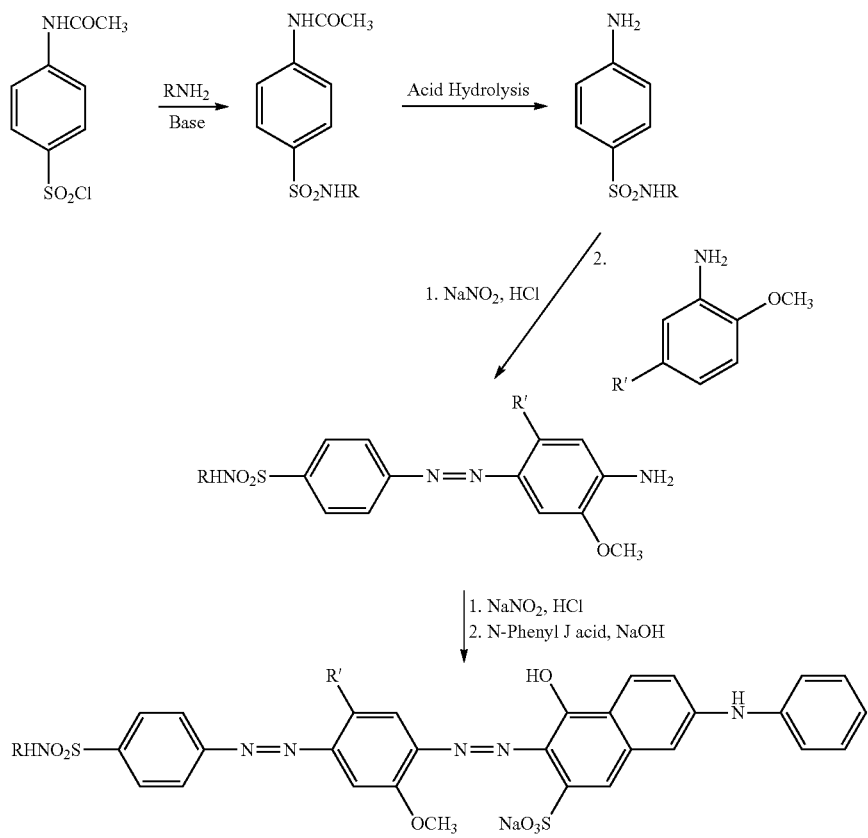

Wherein:
R is selected from the group consisting of alkyl, polyalkyleneoxy, phenyl and substituted phenyl, and
R' is selected from the group consisting of hydrogen, alkyl, or alkoxy.

Other certain bis-azo colorants disclosed herein may be prepared in a similar manner by substituting 2-[2-[2-(2-methoxyethoxy)ethoxy]ethoxy]-5-methylbenzenamine for either 2-methoxy-5-methylbenzenamine or 2,5-dimethoxybenzenamine in the synthesis scheme above.

The base utilized in the first step of the reaction may be selected from sodium carbonate, sodium acetate, sodium hydroxide, or other cationic salts of these respective bases, and tertiary amines.

Acid hydrolysis may be carried out utilizing a strong acid such as hydrochloric acid or sulfuric acid.

Alternatively, the bis-azo colorants disclosed herein may be made according to various procedures known in the art and/or in accordance with the examples of the present invention. For example, coupling may be carried out using polyalkyleneoxy substituted aniline compounds derived by known procedures from starting materials such as 4-methyoxy-2-nitrophenol or 4-methyl-2-nitrophenol, both of which are available from VWR International, LLC (West Chester, Pa., USA).

Laundry Care Compositions

The bluing agents described in the present specification may be incorporated into laundry care compositions including but not limited to laundry detergents and fabric care compositions. The laundry care compositions including laundry detergents may be in solid or liquid form, including a gel form. Such compositions may comprise one or more of said bluing agents and a laundry care ingredient. The bluing agents may be added to substrates using a variety of application techniques. For instance, for application to cellulose-containing textile substrates, the bluing agent may be included as a component of a laundry detergent. Thus, application to a cellulose-containing textile substrate actually occurs when a consumer adds laundry detergent to a washing machine. The bluing agent may be present in the laundry detergent composition in an amount from about 0.0001% to about 10% by weight of the composition, from about 0.0001% to about 5% by weight of the composition, and even from about 0.0001% to about 1% by weight of the composition.

The laundry detergent composition typically comprises a surfactant in an amount sufficient to provide desired cleaning properties. In one aspect, the laundry detergent composition may comprise, based on total laundry detergent composition weight, from about 5% to about 90% of the surfactant, from about 5% to about 70% of the surfactant, or even from about 5% to about 40% of the surfactant. The surfactant may comprise anionic, nonionic, cationic, zwitterionic and/or amphoteric surfactants. In one aspect, the detergent composition comprises anionic surfactant, nonionic surfactant, or mixtures thereof.

Fabric care compositions are typically added in the rinse cycle, which is after the detergent solution has been used and replaced with the rinsing solution in typical laundering processes. The fabric care compositions disclosed herein may be comprise a rinse added fabric softening active and a suitable bluing agent as disclosed in the present specification. The fabric care composition may comprise, based on total fabric care composition weight, from about 1% to about 90%, or from about 5% to about 50% fabric softening active. The bluing agent may be present in the fabric care composition in an amount from about 0.5 ppb to about 50 ppm, or from about 0.5 ppm to about 30 ppm.

Suitable Laundry Care Ingredients

While not essential for the purposes of the present invention, the non-limiting list of laundry care ingredients illustrated hereinafter are suitable for use in the laundry care compositions and may be desirably incorporated in certain aspects of the invention, for example to assist or enhance performance, for treatment of the substrate to be cleaned, or to modify the aesthetics of the composition as is the case with perfumes, colorants, dyes or the like. It is understood that such ingredients are in addition to the components that were previously listed for any particular aspect. The total amount of such adjuncts may range, once the amount of dye is taken into consideration from about 90% to about 99.99999995% by weight of the laundry care composition.

The precise nature of these additional components, and levels of incorporation thereof, will depend on the physical form of the composition and the nature of the operation for which it is to be used. Suitable laundry care ingredients include, but are not limited to, fabric softening actives, polymers, for example cationic polymers, surfactants, builders, chelating agents, dye transfer inhibiting agents, dispersants, enzymes, and enzyme stabilizers, catalytic materials, bleach activators, polymeric dispersing agents, clay soil removal/anti-redeposition agents, brighteners, suds suppressors, dyes, additional perfume and perfume delivery systems, structure elasticizing agents, fabric softeners, carriers, hydrotropes, processing aids and/or pigments. In addition to the disclosure below, suitable examples of such other adjuncts and levels of use are found in U.S. Pat. Nos. 5,576,282, 6,306,812 B1 and 6,326,348 B1 that are incorporated by reference.

As stated, the laundry care ingredients are not essential to Applicants' laundry care compositions. Thus, certain aspects of Applicants' compositions do not contain one or more of the following adjuncts materials: fabric softening actives, bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids and/or pigments. However, when one or more adjuncts are present, such one or more adjuncts may be present as detailed below:

Surfactants

Suitable anionic surfactants useful herein can comprise any of the conventional anionic surfactant types typically used in liquid detergent products. These include the alkyl benzene sulfonic acids and their salts as well as alkoxylated or non-alkoxylated alkyl sulfate materials.

Exemplary anionic surfactants are the alkali metal salts of $C_{10}$-$C_{16}$ alkyl benzene sulfonic acids, or $C_{11}$-$C_{14}$ alkyl benzene sulfonic acids. In one aspect, the alkyl group is linear and such linear alkyl benzene sulfonates are known as "LAS". Alkyl benzene sulfonates, and particularly LAS, are well known in the art. Such surfactants and their preparation are described for example in U.S. Pat. Nos. 2,220,099 and 2,477,383. Especially useful are the sodium and potassium linear straight chain alkylbenzene sulfonates in which the average number of carbon atoms in the alkyl group is from about 11 to 14. Sodium $C_{11}$-$C_{14}$, e.g., $C_{12}$, LAS is a specific example of such surfactants.

Another exemplary type of anionic surfactant comprises ethoxylated alkyl sulfate surfactants. Such materials, also known as alkyl ether sulfates or alkyl polyethoxylate sulfates, are those which correspond to the formula: R'—O—$(C_2H_4O)_n$—$SO_3M$ wherein R' is a $C_8$-$C_{20}$ alkyl group, n is from about 1 to 20, and M is a salt-forming cation. In one aspect, R' is $C_{10}$-$C_{18}$ alkyl, n is from about 1 to 15, and M is sodium, potassium, ammonium, alkylammonium, or alkanolammonium. In one aspect, R' is a $C_{12}$-$C_{16}$, n is from about 1 to 6 and M is sodium.

The alkyl ether sulfates will generally be used in the form of mixtures comprising varying R' chain lengths and varying degrees of ethoxylation. Frequently such mixtures will inevitably also contain some non-ethoxylated alkyl sulfate materials, i.e., surfactants of the above ethoxylated alkyl sulfate formula wherein n=0. Non-ethoxylated alkyl sulfates may also be added separately to the compositions of this invention and used as or in any anionic surfactant component which may be present. Specific examples of non-alkoxylated, e.g., non-ethoxylated, alkyl ether sulfate surfactants are those produced by the sulfation of higher $C_8$-$C_{20}$ fatty alcohols. Conventional primary alkyl sulfate surfactants have the general formula: $ROSO_3$-$M^+$ wherein R is typically a linear $C_8$-$C_{20}$ hydrocarbyl group, which may be straight chain or branched chain, and M is a water-solubilizing cation. In one aspect, R is a $C_{10}$-$C_{15}$ alkyl, and M is alkali metal, more specifically R is $C_{12}$-$C_{14}$ and M is sodium.

Specific, non-limiting examples of anionic surfactants useful herein include: a) $C_{11}$-$C_{18}$ alkyl benzene sulfonates (LAS); b) $C_{10}$-$C_{20}$ primary, branched-chain and random alkyl sulfates (AS); c) $C_{10}$-$C_{18}$ secondary (2,3) alkyl sulfates having formulae (I) and (II): wherein M in formulae (I) and (II) is hydrogen or a cation which provides charge neutrality, and all M units, whether associated with a surfactant or adjunct ingredient, can either be a hydrogen atom or a cation depending upon the form isolated by the artisan or the relative pH of the system wherein the compound is used, with non-limiting examples of suitable cations including sodium, potassium, ammonium, and mixtures thereof, and x is an integer of at least about 7, or at least about 9, and y is an integer of at least 8, or at least about 9; d) $C_{10}$-$C_{18}$ alkyl alkoxy sulfates ($AE_xS$) wherein x is from 1-30; e) $C_{10}$-$C_{18}$ alkyl alkoxy carboxylates in one aspect, comprising 1-5 ethoxy units; f) mid-chain branched alkyl sulfates as discussed in U.S. Pat. Nos. 6,020,303 and 6,060,443; g) mid-chain branched alkyl alkoxy sulfates as discussed in U.S. Pat. Nos. 6,008,181 and 6,020,303; h) modified alkylbenzene sulfonate (MLAS) as discussed in WO 99/05243, WO 99/05242, WO 99/05244, WO 99/05082, WO 99/05084, WO 99/05241, WO 99/07656, WO 00/23549, and WO 00/23548; i) methyl ester sulfonate (MES); and j) alpha-olefin sulfonate (AOS).

Suitable nonionic surfactants useful herein can comprise any of the conventional nonionic surfactant types typically used in liquid detergent products. These include alkoxylated fatty alcohols and amine oxide surfactants. In one aspect, for use in the liquid detergent products herein are those nonionic surfactants which are normally liquid.

Suitable nonionic surfactants for use herein include the alcohol alkoxylate nonionic surfactants. Alcohol alkoxylates are materials which correspond to the general formula: $R^1(C_mH_{2m}O)_nOH$ wherein $R^1$ is a $C_8$-$C_{16}$ alkyl group, m is from 2 to 4, and n ranges from about 2 to 12. In one aspect, $R^1$ is an alkyl group, which may be primary or secondary, that comprises from about 9 to 15 carbon atoms, or from about 10 to 14 carbon atoms. In one aspect, the alkoxylated fatty alcohols will also be ethoxylated materials that contain from about 2 to 12 ethylene oxide moieties per molecule, or from about 3 to 10 ethylene oxide moieties per molecule.

The alkoxylated fatty alcohol materials useful in the liquid detergent compositions herein will frequently have a hydrophilic-lipophilic balance (HLB) which ranges from about 3 to 17 from about 6 to 15, or from about 8 to 15. Alkoxylated fatty alcohol nonionic surfactants have been marketed under the tradenames Neodol and Dobanol by the Shell Chemical Company.

Another suitable type of nonionic surfactant useful herein comprises the amine oxide surfactants. Amine oxides are materials which are often referred to in the art as "semi-polar" nonionics. Amine oxides have the formula: $R(EO)_x(PO)_y(BO)_zN(O)(CH_2R')_2 \cdot qH_2O$. In this formula, R is a relatively long-chain hydrocarbyl moiety which can be saturated or unsaturated, linear or branched, and can contain from 8 to 20, 10 to 16 carbon atoms, or is a $C_{12}$-$C_{16}$ primary alkyl. R' is a short-chain moiety, in one aspect R' may be selected from hydrogen, methyl and —$CH_2OH$. When x+y+z is different from 0, EO is ethyleneoxy, PO is propyleneneoxy and BO is butyleneoxy. Amine oxide surfactants are illustrated by $C_{12-14}$ alkyldimethyl amine oxide.

Non-limiting examples of nonionic surfactants include: a) $C_{12}$-$C_{18}$ alkyl ethoxylates, such as, NEODOL® nonionic surfactants from Shell; b) $C_6$-$C_{12}$ alkyl phenol alkoxylates wherein the alkoxylate units are a mixture of ethyleneoxy and propyleneoxy units; c) $C_{12}$-$C_{18}$ alcohol and $C_6$-$C_{12}$ alkyl phenol condensates with ethylene oxide/propylene oxide block polymers such as Pluronic® from BASF; d) $C_{14}$-$C_{22}$ mid-chain branched alcohols, BA, as discussed in U.S. Pat. No. 6,150,322; e) $C_{14}$-$C_{22}$ mid-chain branched alkyl alkoxylates, $BAE_x$, wherein x if from 1-30, as discussed in U.S. Pat. Nos. 6,153,577, 6,020,303 and 6,093,856; f) Alkylpolysaccharides as discussed in U.S. Pat. No. 4,565,647 to Llenado, issued Jan. 26, 1986; specifically alkylpolyglycosides as discussed in U.S. Pat. Nos. 4,483,780 and 4,483,779; g) Polyhydroxy fatty acid amides as discussed in U.S. Pat. No. 5,332,528, WO 92/06162, WO 93/19146, WO 93/19038, and WO 94/09099; and h) ether capped poly(oxyalkylated) alcohol surfactants as discussed in U.S. Pat. No. 6,482,994 and WO 01/42408.

In the laundry detergent compositions herein, the detersive surfactant component may comprise combinations of anionic and nonionic surfactant materials. When this is the case, the weight ratio of anionic to nonionic will typically range from 10:90 to 90:10, more typically from 30:70 to 70:30.

Cationic surfactants are well known in the art and non-limiting examples of these include quaternary ammonium surfactants, which can have up to 26 carbon atoms. Additional examples include a) alkoxylate quaternary ammonium (AQA) surfactants as discussed in U.S. Pat. No. 6,136,769; b) dimethyl hydroxyethyl quaternary ammonium as discussed in U.S. Pat. No. 6,004,922; c) polyamine cationic surfactants as discussed in WO 98/35002, WO 98/35003, WO 98/35004, WO 98/35005, and WO 98/35006; d) cationic ester surfactants as discussed in U.S. Pat. Nos. 4,228,042, 4,239,660 4,260,529 and 6,022,844; and e) amino surfactants as discussed in U.S. Pat. No. 6,221,825 and WO 00/47708, specifically amido propyldimethyl amine (APA).

Non-limiting examples of zwitterionic surfactants include derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48, for examples of zwitterionic surfactants; betaine, including alkyl dimethyl betaine and cocodimethyl amidopropyl betaine, $C_8$ to $C_{18}$ (in one aspect $C_{12}$ to $C_{18}$) amine oxides and sulfo and hydroxy betaines, such as N-alkyl-N,N-dimethylammino-1-propane sulfonate where the alkyl group can be $C_8$ to $C_{18}$, or $C_{10}$ to $C_{14}$.

Non-limiting examples of ampholytic surfactants include aliphatic derivatives of secondary or tertiary amines, or aliphatic derivatives of heterocyclic secondary and tertiary amines in which the aliphatic radical can be straight- or branched-chain. One of the aliphatic substituents comprises at least about 8 carbon atoms, typically from about 8 to about 18 carbon atoms, and at least one comprises an anionic water-solubilizing group, e.g. carboxy, sulfonate, sulfate. See U.S. Pat. No. 3,929,678 to Laughlin et al., issued Dec. 30, 1975 at column 19, lines 18-35, for examples of ampholytic surfactants.

Aqueous, Non-Surface Active Liquid Carrier

As noted, the laundry care compositions may be in the form of a solid, either in tablet or particulate form, including, but not limited to particles, flakes, sheets, or the like, or the compositions may be in the form of a liquid. The liquid detergent compositions may comprise an aqueous, non-surface active liquid carrier. Generally, the amount of the aqueous, non-surface active liquid carrier employed in the compositions herein will be effective to solubilize, suspend or disperse the composition components. For example, the liquid detergent compositions may comprise, based on total liquid detergent composition weight, from about 5% to about 90%, from about 10% to about 70%, or from about 20% to about 70% of the aqueous, non-surface active liquid carrier.

The most cost effective type of aqueous, non-surface active liquid carrier is typically water. Accordingly, the aqueous, non-surface active liquid carrier component will generally be mostly, if not completely, comprised of water. While other types of water-miscible liquids, such alkanols, diols, other polyols, ethers, amines, and the like, have been conventionally been added to liquid detergent compositions as co-solvents or stabilizers, for purposes of the present invention, the utilization of such water-miscible liquids typically is minimized to hold down composition cost. Accordingly, the aqueous liquid carrier component of the liquid detergent products herein will generally comprise water present in concentrations ranging from about 5% to about 90%, or from about 5% to about 70%, by weight of the liquid detergent composition.

Bleaching Agents

Bleaching Agents—The cleaning compositions of the present invention may comprise one or more bleaching agents. Suitable bleaching agents other than bleaching catalysts include photobleaches, bleach activators, hydrogen peroxide, sources of hydrogen peroxide, preformed peracids and mixtures thereof. In general, when a bleaching agent is used, the compositions of the present invention may comprise from about 0.1% to about 50% or even from about 0.1% to about 25% bleaching agent by weight of the subject cleaning composition. Examples of suitable bleaching agents include:

(1) photobleaches for example sulfonated zinc phthalocyanine;

(2) preformed peracids: Suitable preformed peracids include, but are not limited to, compounds selected from the group consisting of percarboxylic acids and salts, percarbonic acids and salts, perimidic acids and salts, peroxymonosulfuric acids and salts, for example, Oxzone®, and mixtures thereof. Suitable percarboxylic acids include hydrophobic and hydrophilic peracids having the formula R—(C=O)O—O-M wherein R is an alkyl group, optionally branched, having, when the peracid is hydrophobic, from 6 to 14 carbon atoms, or from 8 to 12 carbon atoms and, when the peracid is hydrophilic, less than 6 carbon atoms or even less than 4 carbon atoms; and M is a counterion, for example, sodium, potassium or hydrogen;

(3) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. In one aspect of the invention the inorganic perhydrate salts are selected from the group consisting of sodium salts of perborate, percarbonate and mixtures thereof. When employed, inorganic perhydrate salts are typically present in amounts of from 0.05 to 40 wt %, or 1 to 30 wt % of the overall composition and are typically incorporated into such compositions as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and (4) bleach activators having R—(C=O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). Suitable bleach activators are also disclosed in WO 98/17767. While any suitable bleach activator may be employed, in one aspect of the invention the subject cleaning composition may comprise NOBS, TAED or mixtures thereof.

When present, the peracid and/or bleach activator is generally present in the composition in an amount of from about 0.1 to about 60 wt %, from about 0.5 to about 40 wt % or even from about 0.6 to about 10 wt % based on the composition. One or more hydrophobic peracids or precursors thereof may be used in combination with one or more hydrophilic peracid or precursor thereof.

The amounts of hydrogen peroxide source and peracid or bleach activator may be selected such that the molar ratio of available oxygen (from the peroxide source) to peracid is from 1:1 to 35:1, or even 2:1 to 10:1.

Bleach Boosting Compounds—The compositions herein may comprise one or more bleach boosting compounds. Bleach boosting compounds provide increased bleaching effectiveness in lower temperature applications. The bleach boosters act in conjunction with conventional peroxygen bleaching sources to provide increased bleaching effectiveness. This is normally accomplished through in situ formation of an active oxygen transfer agent such as a dioxirane, an oxaziridine, or an oxaziridinium. Alternatively, preformed dioxiranes, oxaziridines and oxaziridiniums may be used.

Among suitable bleach boosting compounds for use in accordance with the present invention are cationic imines, zwitterionic imines, anionic imines and/or polyionic imines having a net charge of from about +3 to about −3, and mixtures thereof. These imine bleach boosting compounds of the present invention include those of the general structure:

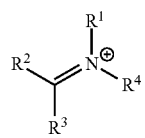

[I]

where $R^1$-$R^4$ may be a hydrogen or an unsubstituted or substituted radical selected from the group consisting of phenyl, aryl, heterocyclic ring, alkyl and cycloalkyl radicals.

Suitable bleach boosting compounds include zwitterionic bleach boosters zwitterionic bleach boosters, which are described in U.S. Pat. Nos. 5,576,282 and 5,718,614. Other bleach boosting compounds include cationic bleach boosters described in U.S. Pat. Nos. 5,360,569; 5,442,066; 5,478,357; 5,370,826; 5,482,515; 5,550,256; and WO 95/13351, WO 95/13352, and WO 95/13353.

Peroxygen sources are well-known in the art and the peroxygen source employed in the present invention may comprise any of these well known sources, including peroxygen compounds as well as compounds, which under consumer use conditions, provide an effective amount of peroxygen in situ. The peroxygen source may include a hydrogen peroxide source, the in situ formation of a peracid anion through the reaction of a hydrogen peroxide source and a bleach activator, preformed peracid compounds or mixtures of suitable peroxygen sources. Of course, one of ordinary skill in the art will recognize that other sources of peroxygen may be employed without departing from the scope of the invention. The bleach boosting compounds, when present, are typically employed in conjunction with a peroxygen source in the bleaching systems of the present invention.

Enzyme Bleaching—Enzymatic systems may be used as bleaching agents. The hydrogen peroxide may also be present by adding an enzymatic system (i.e. an enzyme and a substrate therefore) which is capable of generating hydrogen peroxide at the beginning or during the washing and/or rinsing process. Such enzymatic systems are disclosed in EP Patent Application 91202655.6 filed Oct. 9, 1991.

The present invention compositions and methods may utilize alternative bleach systems such as ozone, chlorine dioxide and the like. Bleaching with ozone may be accomplished by introducing ozone-containing gas having ozone content from about 20 to about 300 g/m³ into the solution that is to contact the fabrics. The gas:liquid ratio in the solution should be maintained from about 1:2.5 to about 1:6. U.S. Pat. No. 5,346,588 describes a process for the utilization of ozone as an alternative to conventional bleach systems and is herein incorporated by reference.

In one aspect, the fabric softening active ("FSA") is a quaternary ammonium compound suitable for softening fabric in a rinse step. In one aspect, the FSA is formed from a reaction product of a fatty acid and an aminoalcohol obtaining mixtures of mono-, di-, and, in one aspect, triester compounds. In another aspect, the FSA comprises one or more softener quaternary ammonium compounds such, but not limited to, as a monoalkyquaternary ammonium compound, a diamido quaternary compound and a diester quaternary ammonium compound, or a combination thereof.

In one aspect of the invention, the FSA comprises a diester quaternary ammonium (hereinafter "DQA") compound composition. In certain aspects of the present invention, the DQA compounds compositions also encompasses a description of diamido FSAs and FSAs with mixed amido and ester linkages as well as the aforementioned diester linkages, all herein referred to as DQA.

A first type of DQA ("DQA (1)") suitable as a FSA in the present CFSC includes a compound comprising the formula:

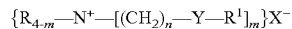

wherein each R substituent is either hydrogen, a short chain $C_1$-$C_6$, for example $C_1$-$C_3$ alkyl or hydroxyalkyl group, e.g., methyl, ethyl, propyl, hydroxyethyl, and the like, poly ($C_{2-3}$ alkoxy), for example. polyethoxy, group, benzyl, or mixtures thereof; each m is 2 or 3; each n is from 1 to about 4, or 2; each Y is —O—(O)C—, —C(O)—O—, —NR—C(O)—, or —C(O)—NR— and it is acceptable for each Y to be the same or different; the sum of carbons in each $R^1$, plus one when Y is —O—(O)C— or —NR—C(O)—, is $C_{12}$-$C_{22}$, or $C_{14}$-$C_{20}$, with each $R^1$ being a hydrocarbyl, or substituted hydrocarbyl group; it is acceptable for $R^1$ to be unsaturated or saturated and branched or linear and in one aspect it is linear; it is acceptable for each $R^1$ to be the same or different and typically these are the same; and $X^-$ can be any softener-compatible anion, suitable anions include, chloride, bromide, methylsulfate, ethylsulfate, sulfate, phosphate, and nitrate, in one aspect the anions are chloride or methyl sulfate. Suitable DQA compounds are typically made by reacting alkanolamines such as MDEA (methyldiethanolamine) and TEA (triethanolamine) with fatty acids. Some materials that typically result from such reactions include N,N-di(acyl-oxyethyl)-N,N-dimethylammonium chloride or N,N-di(acyl-oxyethyl)-N,N-methylhydroxyethylammonium methylsulfate wherein the acyl group is derived from animal fats, unsaturated, and polyunsaturated, fatty acids, e.g., tallow, hardended tallow, oleic acid, and/or partially hydrogenated fatty acids, derived from vegetable oils and/or partially hydrogenated vegetable oils, such as, canola oil, safflower oil, peanut oil, sunflower oil, corn oil, soybean oil, tall oil, rice bran oil, palm oil, etc.

Non-limiting examples of suitable fatty acids are listed in U.S. Pat. No. 5,759,990 at column 4, lines 45-66. In one aspect, the FSA comprises other actives in addition to DQA (1) or DQA. In yet another aspect, the FSA comprises only DQA (1) or DQA and is free or essentially free of any other quaternary ammonium compounds or other actives. In yet another aspect, the FSA comprises the precursor amine that is used to produce the DQA.

In another aspect of the invention, the FSA comprises a compound, identified as DTTMAC comprising the formula:

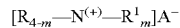

wherein each m is 2 or 3, each $R^1$ is a $C_6$-$C_{22}$, or $C_{14}$-$C_{20}$, but no more than one being less than about $C_{12}$ and then the other is at least about 16, hydrocarbyl, or substituted hydrocarbyl substituent, for example, $C_{10}$-$C_{20}$ alkyl or alkenyl (unsaturated alkyl, including polyunsaturated alkyl, also referred to sometimes as "alkylene"), in one aspect $C_{12}$-$C_{18}$ alkyl or alkenyl, and branch or unbranched. In one aspect, the Iodine Value (IV) of the FSA is from about 1 to 70; each R is H or a short chain $C_1$-$C_6$, or $C_1$-$C_3$ alkyl or hydroxyalkyl group, e.g., methyl, ethyl, propyl, hydroxyethyl, and the like, benzyl, or $(R^2O)_{2-4}H$ where each $R^2$ is a $C_{1-6}$ alkylene group; and $A^-$ is a softener compatible anion, suitable anions include chloride, bromide, methylsulfate, ethylsulfate, sulfate, phosphate, or nitrate; in one aspect the anions are chloride or methyl sulfate.

Examples of these FSAs include dialkydimethylammonium salts and dialkylenedimethylammonium salts such as ditallowedimethylammonium and ditallowedimethylammonium methylsulfate. Examples of commercially available dialkylenedimethylammonium salts usable in the present invention are di-hydrogenated tallow dimethyl ammonium chloride and ditallowedimethyl ammonium chloride available from Degussa under the trade names Adogen® 442 and Adogen® 470 respectively. In one aspect, the FSA comprises other actives in addition to DTTMAC. In yet another aspect, the FSA comprises only compounds of the DTTMAC and is free or essentially free of any other quaternary ammonium compounds or other actives.

In one aspect, the FSA comprises an FSA described in U.S. Pat. Pub. No. 2004/0204337 A1, published Oct. 14, 2004 to Corona et al., from paragraphs 30-79. In another aspect, the FSA is one described in U.S. Pat. Pub. No. 2004/0229769 A1, published Nov. 18, 2005, to Smith et al., on paragraphs 26-31; or U.S. Pat. No. 6,494,920, at column 1, line 51 et seq. detailing an "esterquat" or a quaternized fatty acid triethanolamine ester salt.

In one aspect, the FSA is chosen from at least one of the following: ditallowoyloxyethyl dimethyl ammonium chloride, dihydrogenated-tallowoyloxyethyl dimethyl ammonium chloride, ditallow dimethyl ammonium chloride, ditallowoyloxyethyl dimethyl ammonium methyl sulfate, dihydrogenated-tallowoyloxyethyl dimethyl ammonium chloride, dihydrogenated-tallowoyloxyethyl dimethyl ammonium chloride, or combinations thereof.

In one aspect, the FSA may also include amide containing compound compositions. Examples of diamide comprising compounds may include but not limited to methyl-bis(tallowamidoethyl)-2-hydroxyethylammonium methyl sulfate (available from Degussa under the trade names Varisoft 110 and Varisoft 222). An example of an amide-ester containing compound is N-[3-(stearoylamino)propyl]-N-[2-(stearoyloxy)ethoxy)ethyl)]-N-methylamine.

Another aspect of the invention provides for a rinse added fabric softening composition further comprising a cationic starch. Cationic starches are disclosed in US 2004/0204337 A1. In one aspect, the rinse added fabric softening composition comprises from about 0.1% to about 7% of cationic starch by weight of the fabric softening composition. In one aspect, the cationic starch is HCP401 from National Starch.

Builders—The compositions of the present invention can comprise one or more detergent builders or builder systems. When present, the compositions will typically comprise at least about 1% builder, or from about 5% or 10% to about 80%, 50%, or even 30% by weight, of said builder. Builders include, but are not limited to, the alkali metal, ammonium and alkanolammonium salts of polyphosphates, alkali metal silicates, alkaline earth and alkali metal carbonates, aluminosilicate builders polycarboxylate compounds. ether hydroxypolycarboxylates, copolymers of maleic anhydride with ethylene or vinyl methyl ether, 1,3,5-trihydroxybenzene-2,4,6-trisulphonic acid, and carboxymethyl-oxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Chelating Agents—The compositions herein may also optionally contain one or more copper, iron and/or manganese chelating agents. If utilized, chelating agents will generally comprise from about 0.1% by weight of the compositions herein to about 15%, or even from about 3.0% to about 15% by weight of the compositions herein.

Dye Transfer Inhibiting Agents—The compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in the compositions herein, the dye transfer inhibiting agents are present at levels from about 0.0001%, from about 0.01%, from about 0.05% by weight of the cleaning compositions to about 10%, about 2%, or even about 1% by weight of the cleaning compositions.

Dispersants—The compositions of the present invention can also contain dispersants. Suitable water-soluble organic materials are the homo- or co-polymeric acids or their salts, in which the polycarboxylic acid may comprise at least two carboxyl radicals separated from each other by not more than two carbon atoms.

Enzymes—The compositions can comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is a cocktail of conventional applicable enzymes like protease, lipase, cutinase and/or cellulase in conjunction with amylase.

Enzyme Stabilizers—Enzymes for use in compositions, for example, detergents can be stabilized by various techniques. The enzymes employed herein can be stabilized by the presence of water-soluble sources of calcium and/or magnesium ions in the finished compositions that provide such ions to the enzymes.

Process of Making

The liquid detergent compositions are in the form of an aqueous solution or uniform dispersion or suspension of surfactant, bluing agent, and certain optional other ingredients, some of which may normally be in solid form, that have been combined with the normally liquid components of the composition, such as the liquid alcohol ethoxylate nonionic, the aqueous liquid carrier, and any other normally liquid optional ingredients. Such a solution, dispersion or suspension will be acceptably phase stable and will typically have a viscosity which ranges from about 100 to 600 cps, or from about 150 to 400 cps. For purposes of this invention, viscosity is measured with a Brookfield LVDV-II+ viscometer apparatus using a #21 spindle.

The liquid detergent compositions herein can be prepared by combining the components thereof in any convenient order and by mixing, e.g., agitating, the resulting component combination to form a phase stable liquid detergent composition. In a process for preparing such compositions, a liquid matrix is formed containing at least a major proportion, or even substantially all, of the liquid components, e.g., nonionic surfactant, the non-surface active liquid carriers and other optional liquid components, with the liquid components being thoroughly admixed by imparting shear agitation to this liquid combination. For example, rapid stirring with a mechanical stirrer may usefully be employed. While shear agitation is maintained, substantially all of any anionic surfactants and the solid form ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills, are incorporated. As a variation of the composition preparation procedure hereinbefore described, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

In one aspect of forming the liquid detergent compositions, the bluing agent is first combined with one or more liquid components to form a bluing agent premix, and this bluing agent premix is added to a composition formulation containing a substantial portion, for example more than 50% by weight, more specifically, more than 70% by weight, and yet more specifically, more than 90% by weight, of the balance of components of the laundry detergent composition. For example, in the methodology described above, both the bluing agent premix and the enzyme component are added at a final stage of component additions. In another aspect, the bluing agent is encapsulated prior to addition to the detergent composition, the encapsulated bluing agent is suspended in a structured liquid, and the suspension is added to a composition formulation containing a substantial portion of the balance of components of the laundry detergent composition.

As noted previously, the detergent compositions may be in a solid form. Suitable solid forms include tablets and particulate forms, for example, granular particles, flakes or sheets. Various techniques for forming detergent compositions in such solid forms are well known in the art and may be used herein. In one aspect, for example when the composition is in the form of a granular particle, the bluing agent is provided in particulate form, optionally including additional but not all components of the laundry detergent composition. The bluing agent particulate is combined with one or more additional particulates containing a balance of components of the laundry detergent composition. Further, the bluing agent, optionally including additional but not all components of the laundry detergent composition, may be provided in an encapsulated form, and the bluing agent encapsulate is combined with particulates containing a substantial balance of components of the laundry detergent composition.

The compositions of this invention, prepared as hereinbefore described, can be used to form aqueous washing solutions for use in the laundering of fabrics. Generally, an effective amount of such compositions is added to water, for example in a conventional fabric laundering automatic washing machine, to form such aqueous laundering solutions. The aqueous washing solution so formed is then contacted, typically under agitation, with the fabrics to be laundered therewith. An effective amount of the liquid detergent compositions herein added to water to form aqueous laundering solutions can comprise amounts sufficient to form from about 500 to 7,000 ppm of composition in aqueous washing solution, or from about 1,000 to 3,000 ppm of the detergent compositions herein will be provided in aqueous washing solution.

Method of Use

Certain of the consumer products disclosed herein can be used to clean or treat a situs inter alia a surface or fabric. Typically at least a portion of the situs is contacted with an embodiment of Applicants' consumer product, in neat form or diluted in a liquor, for example, a wash liquor and then the situs may be optionally washed and/or rinsed. In one aspect, a situs is optionally washed and/or rinsed, contacted with an aspect of the consumer product and then optionally washed and/or rinsed. For purposes of the present invention, washing includes but is not limited to, scrubbing, and mechanical agitation. The fabric may comprise most any fabric capable of being laundered or treated in normal consumer use conditions. Liquors that may comprise the disclosed compositions may have a pH of from about 3 to about 11.5. Such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1. Employing one or more of the aforementioned methods results in a treated situs.

EXAMPLES

The following examples are provided to further illustrate the bluing agents of the present invention; however, they are not to be construed as limiting the invention as defined in the claims appended hereto. In fact, it will be apparent to those skilled in the art that various modifications and variations can be made in this invention without departing from the scope or spirit of the invention. All parts and percents given in these examples are by weight unless otherwise indicated.

Sample Preparation and Test Methods

A. Sample Preparation

The following bis-azo colorants are prepared as described herein. The UV-visible spectrum of each colorant is determined by dissolving it in a suitable solvent, typically water or methanol, at a concentration that gives an absorbance at the lambda max of less than 1.0 at a path length of 1.0 cm. A Beckman Coulter DU 800 spectrophotometer was used to measure the UV-visible spectrum and determine the lambda max ("$\lambda_{max}$") of each sample.

Example 1

To an aqueous suspension of 11.68 grams of p-acetamidobenzenesuffonyl chloride cooled to 15-20° C. is added 8.15 grams of 3-(2-(2-hydroxyethoxy)ethoxy)propylamine at a rate sufficient to keep the temperature below 20° C. Aqueous sodium hydroxide solution is added as needed to keep the pH at >7. After 2 hours of stirring, the reaction is complete and 50 ml of concentrated hydrochloric acid is added, and the mixture refluxed until the infrared spectrum indicated that the acetyl group has been cleaved. The mixture is cooled to 0-5° C. and 3.58 grams of sodium nitrite is added to the mixture and stirred for 2 hours. The resulting diazonium salt is added to a cooled solution of 6.85 grams of 2-methoxy-5-methylaniline in dilute aqueous hydrochloric acid resulting in a deep orange red product. This product is further diazotized at 0-5° C. by adding 3.58 grams of sodium nitrite with additional hydrochloric acid as necessary to keep the pH at <2. The mixture is stirred for 2 hours. The resulting diazonium salt is added to a cooled (0-5° C.) aqueous solution of H-acid in water containing sufficient sodium hydroxide to dissolve the acid. The pH of the reaction mixture is kept at 10-12 during the addition of the diazonium salt by adding sodium hydroxide solution as necessary. This resulted in a solution of the deep violet colored product represented as Formula BA4 herein. The product has a ("$\lambda_{max}$") of 569 nm in water.

Example 2

The product represented as Formula BA13 herein is prepared in a similar manner to Example 1 except 7.65 grams of 2,5-dimethoxyaniline are substituted for 2-methoxy-5-methylaniline. The product has a ("$\lambda_{max}$") 583 nm in water.

Example 3

The product represented as Formula BA31 herein is prepared in a similar manner to Example 1 except 9.75 grams of N-acetyl-H acid are substituted for H acid. The product has a ("$\lambda_{max}$") of 560 nm in water.

Example 4

The product represented as Formula BA58 herein is prepared in a similar manner to Example 1 except 15.75 grams of N-phenyl J acid are substituted for H acid. The product has a ("$\lambda_{max}$") 545 nm in water.

Example 5

The product represented as Formula BA67 herein is prepared in a similar manner to Example 2 except 15.75 grams of N-phenyl J acid are substituted for H acid. The product has a ("$\lambda_{max}$") of 558 nm in water.

Example 6

The product represented as Formula BA5 herein is prepared in a similar manner to Example 1 except 8.85 grams of 3-(2-(2-methoxyethoxy)ethoxy)propylamine are substituted for 3-(2-(2-hydroxyethoxy)ethoxy)propylamine. The product has a ("$\lambda_{max}$") of 577 nm in water.

Example 7

The product represented as Formula BA14 herein is prepared in a similar manner to Example 6 except 7.65 grams of 2,5-dimethoxyaniline are substituted for 2-methoxy-5-methylaniline. The product has a ("$\lambda_{max}$") 608 nm in methanol.

Example 8

The product represented as Formula BA12 herein is prepared in a similar manner to Example 7 except 30.70 grams of Surfonamine® B60 are substituted for 3-(2-(2-methoxyethoxy)ethoxy)propylamine. The product has a ("$\lambda_{max}$") 590 nm in water.

Example 9

The product represented as Formula BA2 herein is prepared in a similar manner to Example 6 except 52.90 grams of Surfonamine® L100 are substituted for 3-(2-(2-methoxyethoxy)ethoxy)propylamine. The product has a ("$\lambda_{max}$") of 581 nm in water.

Example 10

The product represented as Formula BA11 herein is prepared in a similar manner to Example 8 except 52.90 grams of Surfonamine® L100 are substituted for 3-(2-(2-methoxyethoxy)ethoxy)propylamine. The product has a ("$\lambda_{max}$") of 578 nm in water.

Example 11

To a cold (0-5° C.) solution of p-polyalkyleneoxyphenylamine (27.45 grams in 100 ml of water), containing sufficient hydrochloric acid to give a pH of 1, are added 3.58 grams of sodium nitrite. The mixture is stirred for 2 hours. The mixture is then added to a cold solution of 7.65 grams of 2,5-dimethoxyaniline in dilute hydrochloric acid to give an orange colored product. This product is further diazotized by adding sufficient hydrochloric acid to keep the pH at 1 followed by 3.58 grams of sodium nitrite. After stirring 2 hours at 0-5° C., the mixture is added to an aqueous solution of 15.85 grams of H acid along with sufficient sodium hydroxide to dissolve the H acid. During the addition of the diazonium salt, the pH is kept at 10-12 by the addition of aqueous sodium hydroxide solution. This resulted in a violet colored product represented as Formula BA18 herein. The product has a ("$\lambda_{max}$") of 574 nm in methanol.

Example 12

The product represented as Formula BA15 herein is prepared in a similar manner to Example 2 except 27.45 grams of p-polyalkyleneoxyphenylamine are substituted for 3-(2-(2-hydroxyethoxy)ethoxy)propylamine. The product has a ("$\lambda_{max}$") of 574 nm in methanol.

Example 13

The product represented as Formula BA17 herein is prepared in a similar manner to Example 2 except 5.25 grams of diethanolamine are substituted for 3-(2-(2-hydroxyethoxy)ethoxy)propylamine. The product has a ("$\lambda_{max}$") of 581 nm in water.

Example 14

The product represented as Formula BA1 herein is prepared in a similar manner to Example 1 except 35.75 grams of Jeffamine® M715 are substituted for 3-(2-(2-hydroxyethoxy)ethoxy)propylamine. The product has a ("$\lambda_{max}$") 578 nm in water.

Example 15

The product represented as Formula BA28 herein is prepared in a similar manner to Example 3 except 35.75 grams of Jeffamine® M715 are substituted for 3-(2-(2-hydroxyethoxy)ethoxy)propylamine. The product has a ("$\lambda_{max}$") of 563 nm in water.

Example 16

The product represented as Formula BA55 herein is prepared in a similar manner to Example 4 except 35.75 grams of Jeffamine® M715 are substituted for 3-(2-(2-hydroxyethoxy)ethoxy)propylamine. The product has a ("$\lambda_{max}$") of 545 nm in methanol.

Example 17

The product represented as Formula BA34 herein is prepared in a similar manner to Example 3 except 3.65 grams of diethylamine are substituted for 3-(2-(2-hydroxyethoxy)ethoxy)propylamine. The product has a ("$\lambda_{max}$") of 560 nm in water.

Example 18

The product represented as Formula BA61 herein is prepared in a similar manner to Example 17 except 15.75 grams of N-phenyl J acid are substituted for N-acetyl H acid. The product has a ("$\lambda_{max}$") of 551 nm in methanol.

Example 19

The product represented as Formula BA7 herein is prepared in a similar manner to Example 17 except 15.90 grams of H acid are substituted for N-acetyl H acid. The product has a ("$\lambda_{max}$") of 599 nm in methanol.

The bis-azo colorants set forth in Table A conform generally to Structure (II) and are prepared according to the methods described herein.

TABLE A

Bis-Azo Colorants

| Sample No. | R1 | R2 | W | X | Y | Z |
|---|---|---|---|---|---|---|
| Example 1 | CH$_3$O | CH$_3$ | 3-(2-(2-hydroxyethoxy)ethoxy)propylamino | NH$_2$ | SO$_3$Na | SO$_3$Na |
| Example 2 | CH$_3$O | CH$_3$O | 3-(2-(2-hydroxyethoxy)ethoxy)propylamino | NH$_2$ | SO$_3$Na | SO$_3$Na |

TABLE A-continued

Bis-Azo Colorants

| Sample No. | R1 | R2 | W | X | Y | Z |
|---|---|---|---|---|---|---|
| Example 3 | CH$_3$O | CH$_3$ | 3-(2-(2-hydroxyethoxy)ethoxy)propylamino | NHAcetyl | SO$_3$Na | SO$_3$Na |
| Example 4 | CH$_3$O | CH$_3$ | 3-(2-(2-hydroxyethoxy)ethoxy)propylamino | H | SO$_3$Na | NHPhenyl |
| Example 5 | CH$_3$O | CH$_3$O | 3-(2-(2-hydroxyethoxy)ethoxy)propylamino | H | SO$_3$Na | NHPhenyl |
| Example 6 | CH$_3$O | CH$_3$ | 3-(2-(2-methoxyethoxy)ethoxy)propylamino | NH$_2$ | SO$_3$Na | SO$_3$Na |
| Example 7 | CH$_3$O | CH$_3$O | 3-(2-(2-methoxyethoxy)ethoxy)propylamino | NH$_2$ | SO$_3$Na | SO$_3$Na |
| Example 8 | CH$_3$O | CH$_3$O | Surfonamine® B60 | NH$_2$ | SO$_3$Na | SO$_3$Na |
| Example 9 | CH$_3$O | CH$_3$ | Surfonamine® L100 | NH$_2$ | SO$_3$Na | SO$_3$Na |
| Example 10 | CH$_3$O | CH$_3$O | Surfonamine® L100 | NH$_2$ | SO$_3$Na | SO$_3$Na |
| Example 12 | CH$_3$O | CH$_3$O | p-polyalkyleneoxyphenylamino | NH$_2$ | SO$_3$Na | SO$_3$Na |
| Example 13 | CH$_3$O | CH$_3$O | Dihydroxyethylamino | NH$_2$ | SO$_3$Na | SO$_3$Na |
| Example 14 | CH$_3$O | CH$_3$ | Jeffamine® M715 | NH$_2$ | SO$_3$Na | SO$_3$Na |
| Example 15 | CH$_3$O | CH$_3$ | Jeffamine® M715 | NHAcetyl | SO$_3$Na | SO$_3$Na |
| Example 16 | CH$_3$O | CH$_3$ | Jeffamine® M715 | H | SO$_3$Na | NHPhenyl |
| Example 17 | CH$_3$O | CH$_3$ | Diethylamino | NHAcetyl | SO$_3$Na | SO$_3$Na |
| Example 18 | CH$_3$O | CH$_3$ | Diethylamino | H | SO$_3$Na | NHPhenyl |
| Example 19 | CH$_3$O | CH$_3$ | Diethylamino | NH$_2$ | SO$_3$Na | SO$_3$Na |

Surfonamine® and Jeffamine® products are amino terminated polyalkyleneoxy ethers available from Huntsman Corporation of The Woodlands, Texas that have the general structure:

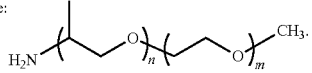

For Example 11, which conforms generally to Structure (I), R$_1$=OCH$_3$, R$_2$=OCH$_3$, R$_3$=6-substituted H acid, and X=p-polyalkyleneoxyphenylazo.

The chemical names for the corresponding colorants of Table A are respectively provided in Table B below. The chemical names are determined using ChemDraw Ultra; Version 7.0.1, available from CambridgeSoft, Cambridge, Mass., USA.

TABLE B

Chemical Names for Bis-Azo Colorants

| Sample No. | Chemical Name |
|---|---|
| Example 1 | 5-Amino-4-hydroxy-3-[4-(4-{3-[2-(2-hydroxy-ethoxy)-ethoxy]-propylsulfamoyl}-phenylazo)-2-methoxy-5-methyl-phenylazo]-naphthalene-2,7-disulfonic acid, disodium salt |
| Example 2 | 5-Amino-4-hydroxy-3-[4-(4-{3-[2-(2-hydroxy-ethoxy)-ethoxy]-propylsulfamoyl}-phenylazo)-2,5-dimethoxy-phenylazo]-naphthalene-2,7-disulfonic acid, disodium salt |
| Example 3 | 5-Acetylamino-4-hydroxy-3-[4-(4-{3-[2-(2-hydroxy-ethoxy)-ethoxy]-propylsulfamoyl}-phenylazo)-5-methoxy-2-methyl-phenylazo]-naphthalene-2,7-disulfonic acid, disodium salt |
| Example 4 | 4-Hydroxy-3-[4-(4-{3-[2-(2-hydroxy-ethoxy)-ethoxy]-propylsulfamoyl}-phenylazo)-5-methoxy-2-methyl-phenylazo]-7-phenylamino-naphthalene-2-sulfonic acid, sodium salt |
| Example 5 | 4-Hydroxy-3-[4-(4-{3-[2-(2-hydroxy-ethoxy)-ethoxy]-propylsulfamoyl}-phenylazo)-2,5-dimethoxy-phenylazo]-7-phenylamino-naphthalene-2-sulfonic acid, sodium salt |
| Example 6 | 5-Amino-4-hydroxy-3-[2-methoxy-4-(4-{3-[2-(2-methoxyethoxy)-ethoxy]-propylsulfamoyl}-phenylazo)-5-methyl-phenylazo]-naphthalene-2,7-disulfonic acid, disodium salt |
| Example 7 | 5-Amino-3-[2,5-dimethoxy-4-(4-{3-[2-(2-methoxy-ethoxy)-ethoxy]-propylsulfamoyl}-phenylazo)-phenylazo]-4-hydroxy-naphthalene-2,7-disulfonic acid |
| Example 8 | 5-Amino-4-hydroxy-3-[2,5-dimethoxy-4-(4-polyalkyleneoxysulfamoyl phenylazo)-phenylazo]-naphthalene-2,7-disulfonic acid, disodium salt |
| Example 9 | 5-Amino-4-hydroxy-3-[2-methoxy-4-(4-polyalkyleneoxysulfamoyl phenylazo)-5-methyl-phenylazo]-naphthalene-2,7-disulfonic acid, disodium salt |
| Example 10 | 5-Amino-4-hydroxy-3-[2,5-dimethoxy-4-(4-polyalkyleneoxysulfamoyl phenylazo)-phenylazo]-naphthalene-2,7-disulfonic acid, disodium salt |
| Example 11 | 5-Amino-4-hydroxy-3-[2,4-dimethoxy-4-(4-polyalkyleneoxyphenyl)sulfamoyl phenylazo]-phenylazo]-naphthalene-2,7-disulfonic acid, disodium salt |
| Example 12 | 5-Amino-4-hydroxy-3-[2,5-dimethoxy-4-(4-polyalkyleneoxysulfamoyl phenylazo)-phenylazo]-naphthalene-2,7-disulfonic acid, disodium salt |
| Example 13 | 5-Amino-3-(4-{4-[bis-(2-hydroxy-ethyl)-sulfamoyl]-phenylazo}-2,5-dimethoxy-phenylazo)-4-hydroxy-naphthalene-2,7-disulfonic acid, disodium salt |

TABLE B-continued

Chemical Names for Bis-Azo Colorants

| Sample No. | Chemical Name |
|---|---|
| Example 14 | 5-Amino-4-hydroxy-3-[4-(4-polyalkyleneoxysulfamoyl-phenylazo)-2-methoxy-5-methyl-phenylazo]-naphthalene-2,7-disulfonic acid, isodium salt |
| Example 15 | 5-Acetylamino-4-hydroxy-3-[4-(4-polyoxalkyenesulfamoylphenylazo)-5-methoxy-2-methyl-phenylazo]-naphthalene-2,7-disulfonic acid, disodium salt |
| Example 16 | 4-Hydroxy-3-[4-(4-polyalkyleneoxysulfamoyl-phenylazo)-5-methoxy-2-methyl-phenylazo]-7-phenylamino-naphthalene-2-sulfonic acid, sodium salt |
| Example 17 | 5-Acetylamino-3-[4-(4-diethylsulfamoyl-phenylazo)-5-methoxy-2-methyl-phenylazo]-4-hydroxy-naphthalene-2,7-disulfonic acid, disodium salt |
| Example 18 | 3-[4-(4-Diethylsulfamoyl-phenylazo)-2-methoxy-5-methyl-phenylazo]-4-hydroxy-7-phenylamino-naphthalene-2-sulfonic acid, sodium salt |
| Example 19 | 5-Amino-3-[4-(4-diethylsulfamoyl-phenylazo)-5-methoxy-2-methyl-phenylazo]-4-hydroxy-naphthalene-2,7-disulfonic acid, disodium salt |

Structural representations of Examples 1-19 are provided herein.

B. Test Methods

I. Method for Determining Molar Absorptivity ($\epsilon$)

The Molar Absorptivity is determined by dissolving a known amount of the compound in a suitable solvent and measuring the absorbance of the solution on an ultraviolet-visible spectrophotometer. The absorptivity is calculated by dividing the absorbance by the molar concentration in moles/liter and the path length which is typically one centimeter.

Washing of Fabric: Each dye is run in a simulated wash of CW120 fabric (16 oz white cotton interlock knit fabric, 270 g/square meter, brightened with Uvitex BNB fluorescent whitening agent, from Test Fabrics. P.O. Box 26, Weston, Pa., 18643) using typical conditions for North American heavy duty laundry detergent ("NA HDL" or "HDL") (788 ppm dose, 20° C., 6 gpg 3:1 Ca:Mg, 30:1 liquor:fabric ratio, 30 minutes) at six dilutions, with the highest wash water absorbance being set close to a value of 1.0. Fabrics are rinsed once for 5 minutes and air dried.

L*, a* and b* values are measured on each fabric (four internal replicates for each wash condition) using a Hunter LabScan XE reflectance spectrophotometer with D65 illumination, 10° observer and UV filter excluded, and difference values calculated against a nil-dye HDL reference.

II. Method for Determining Specific Deposition ($Abs^{\Delta b=-2}$)

From the plot of wash solution absorbance vs. $\Delta b^*$, the wash solution absorbance necessary to deliver a $\Delta b^*$ of $-2.0$ on fabric is determined by linear interpolation of the two data points that bracket the target $\Delta b^*$.

III. Method for Determining Relative Hue Angle ($\theta_R$) and Absolute Hue Angle ($\theta_A$)

From a plot of $\Delta a^*$ vs. $\Delta b^*$ for each concentration point of a given compound, the $\Delta a^*$ value at $\Delta b^*=-2.0$ is determined by interpolation of the two data points that bracketed $\Delta b^*=-2.0$. The relative hue angle $\theta_R$ is then calculated as $270+\arctan(|\Delta a^*/\Delta b^*|)$ for positive values of $\Delta a^*$ and $270-\arctan(|\Delta a^*/\Delta b^*|)$ where $\Delta a^*$ is negative.

The $\Delta a^*$ value at $\Delta b^*=-2.0$ is added to the a* value, and $-2.0$ is added to the b* value of a tracer fabric washed in nil-dye HDL (a*=2.0; b*=-15.5; average of 24 replicates). The absolute hue angle is determined at the concentration of dye that delivers $\Delta b^*=-2.0$, using $a^*_{Dye}$ and $b^*_{Dye}$ as defined below:

$$a^*_{Dye}=a^*_{tracer}+\Delta a^*_{Dye}=2.0+\Delta a^*_{Dye}$$

$$b^*_{Dye}=b^*_{tracer}+\Delta b^*_{Dye}=-15.5+(-2.0)=-17.5.$$

The absolute hue angle $\theta_A$ is calculated as $270+\arctan(|a^*_{Dye}/b^*_{Dye}|)$ for positive values of $a^*_{Dye}$ and $270-\arctan(|a^*_{Dye}/b^*_{Dye}|)$ where $a^*_{Dye}$ is negative.

IV. Method for Determining Surface Color

The surface color of an article may be quantified using a series of measurements —L*, a*, and b* —generated by measuring the samples using a spectrophotometer. The equipment used for this test is a Gretag Macbeth Color Eye 7000A spectrophotometer. The software program used is "Color imatch." "L" is a measure of the amount of white or black in a sample; higher "L" values indicate a lighter colored sample. A measure of the amount of red or green in a sample is determined by "a*" values. A measure of the amount of blue or yellow in a sample is determined by "b*" values; lower (more negative) b* values indicate more blue on a sample.

V. Method for Determining Hueing Efficiency for Detergents a.) Two 25 cm×25 cm fabric swatches of 16 oz white cotton interlock knit fabric (270 g/square meter, brightened with Uvitex BNB fluorescent whitening agent, from Test Fabrics. P.O. Box 26, Weston, Pa., 18643), are obtained.

b.) Prepare two one liter aliquots of tap water containing 1.55 g of AATCC standard heavy duty liquid (HDL) test detergent as set forth in Table 3.

c.) Add a sufficient amount the dye to be tested to one of the aliquots from Step b.) above to produce an aqueous solution absorbance of 1 AU.

d.) Wash one swatch from a.) above in one of the aliquots of water containing 1.55 g of AATCC standard heavy duty liquid (HDL) test detergent and wash the other swatch in the other aliquot. Such washing step should be conducted for 30 minutes at room temperature with agitation. After such washing step separately rinse the swatches in tap water and air dry the swatches in the dark.

e.) After rinsing and drying each swatch, the hueing efficiency, $DE^*_{eff}$ of the dye is assessed by determining the L*, a*, and b* value measurements of each swatch using a Hunter LabScan XE reflectance spectrophotometer with D65 illumination, 10° observer and UV filter excluded. The hueing efficiency of the dye is then calculated using the following equation:

$$DE^*_{eff}=((L^*_c-L^*_s)^2+(a^*_c-a^*_s)^2+(b^*_c-b^*_s)^2)^{1/2}$$

wherein the subscripts c and s respectively refer to the L*, a*, and b* values measured for the control, i.e., the fabric sample washed in detergent with no dye, and the fabric sample washed in detergent containing the dye to be screened.

VI. Method for Determining Wash Removability a.) Prepare two separate 150 ml aliquots of HDL detergent solution set forth in Table 1, according to AATCC Test Method 61-2003, Test 2A and containing 1.55 g/liter of the AATCC HDL formula in distilled water.

b.) A 15 cm×5 cm sample of each fabric swatch from the Method for Determining of Hueing Efficiency For Detergents described above is washed in a Launderometer for 45 minutes at 49° C. in 150 ml of a the HDL detergent solution prepared according to Step II. a.) above.

c.) The samples are rinsed with separate aliquots of rinse water and air dried in the dark, and then L*, a*, and b* value measurements of each swatch are taken using a Hunter LabScan XE reflectance spectrophotometer with D65 illumination, 10° observer and UV filter excluded. The amount of residual coloration is assessed by measuring the $DE^*_{res}$, calculated using the following equation:

$$DE^*_{res} = ((L^*_c - L^*_s)^2 + (a^*_c - a^*_s)^2 + (b^*_c - b^*_s)^2)^{1/2}$$

wherein the subscripts c and s respectively refer to the L*, a*, and b* values measured for the control, i.e., the fabric sample initially washed in detergent with no dye, and the fabric sample initially washed in detergent containing the dye to be screened. The wash removal value for the dye is then calculated according to the formula: % removal=$100 \times (1 - DE^*_{res}/DE^*_{eff})$.

VII. Method for Determining Staining

This procedure uses three fabric types to determine the propensity of a dye dissolved in a detergent matrix to stain fabric in a manner similar to a home laundry pre-treat scenario. The three primary fibers examined are cotton, nylon, and spandex (a synthetic polymer having urethane blocks) that comprise the following fabrics:

16 oz cotton interlock knit fabric (270 g/square meter, brightened with Uvitex BNB fluorescent whitening agent, obtained from Test Fabrics. P.O. Box 26, Weston, Pa., 18643), 6.3 oz 90% Cotton/10% Lycra®, Stock # CLF, obtained from Dharma Trading Co., 1604 Fourth St. San Rafael, Calif. 94901, 80% Nylon/20% Spandex, Item #983684GN, obtained from Hancock Fabrics, One Fashion Way, Baldwyn, Miss. 38824.

A one inch diameter circle for each of the dyed detergent samples was drawn using a template and labeled with the dye identification on the test fabrics with a non-staining, acrylic ink textile marker (TEXPEN textile marker made by Marktex Corp., Englewood, N.J. 07631).

The test fabrics were placed on top of a piece of plastic backed paper counter sheet, or alternatively, a single layer of paper towel over aluminum foil, and stained at the 16 hrs, 1 hr, and 15 min time intervals. Staining was done by placing approximately 0.5 g of the dyed detergent on the fabric allowing it to soak through the fabric with the excess being absorbed by the counter sheet so that the circular test area was saturated with detergent without spreading to adjacent test circles. Due to possible light fading of the dyes, they were placed under a covered area to prevent direct exposure to light while allowing air to pass over the fabrics. The 16 hr stains were applied in the evening while the 1 hr and 15 min swatches were stained the following morning prior to washing. The approximate total amount of detergent applied is calculated by multiplying the total number of stained areas by the amount of detergent delivered for each stain. If this amount exceeds the recommended dosage for the detergent then divide the total detergent by the recommended dosage to determine the number of wash loads to distribute the stained fabrics. If the stained fabrics do not provide the total recommended amount of detergent for a load, then the balance of the detergent is filled with Tide Free (nil-dye) detergent.

The pretreated fabrics are washed in a full scale Kenmore top loading washer with 5.5 lbs of terry washcloths used as ballast under median North American conditions of 17 gallons of 90° F./6 grains per gallon of hardness wash water with a rinse of 60° F./6 grains per gallon of hardness water. After the wash is complete the test fabrics are dried with the ballast in a forced heated air drier at the highest temperature setting for 60 minutes, or until completely dry.

The circled stain areas were analyzed using a Hunter Colorquest or Labscan XE with D65 lighting, UV filter not included and a 0.5" port opening. A nil-dye pre-treat control stain was used as the instrument reference standard for calculating the DE* because the detergent contains brightener. Visual assessment is done under fluorescent lights with a white paper (92 brightness) background under the swatch. The DE*/Visual Scale allows communication of stain intensity in a non-technical manner.

DE*/Visual Scale

| | |
|---|---|
| <1 = 0 | No visible staining |
| 1-2.5 = 1 | Slightly off white area |
| 2.5-5 = 2 | Light but visible stain |
| 5-10 = 3 | Clearly visible stain |
| >10 = 4 | A dark stain |

Test Results

Test 1: Determination of Component Parts of Bis-Azo Colorants

TABLE 1

A, B and C moieties used to construct bluing agents

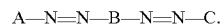

A Moieties

A1

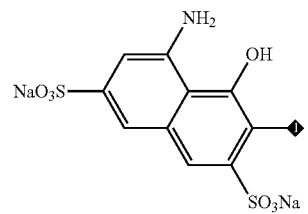

TABLE 1-continued

A, B and C moieties used to construct bluing agents
A—N=N—B—N=N—C.

| | |
|---|---|
| A2 | [structure: naphthalene with acetamido-NH, OH, NaO₃S, SO₃Na substituents] |
| A3 | [structure: naphthalene with phenyl-NH, OH, SO₃Na substituents] |

B Moieties

| | |
|---|---|
| B1 | —O-[dimethylphenyl]-* |
| B2 | —O-[methoxy-methylphenyl]-* |
| B3 | Me(EO)₃O-[methylphenyl]-* |

C Moieties

| | |
|---|---|
| C1 | *-[C₆H₄]-S(O)₂-NH-(PO)₃(EO)₁₃Me |
| C2 | *-[C₆H₄]-S(O)₂-NH-(PO)₃(EO)₁₉Me |
| C3 | *-[C₆H₄]-S(O)₂-NH-(PO)₉(EO)₁Me |
| C4 | *-[C₆H₄]-S(O)₂-NH-(CH₂)₃O(EO)₂H |
| C5 | *-[C₆H₄]-S(O)₂-NH-(CH₂)₃O(EO)₂Me |
| C6 | *-[C₆H₄]-S(O)₂-NH-[C₆H₄]-O(EO)₁₀H |
| C7 | *-[C₆H₄]-S(O)₂-N(Et)₂ |
| C8 | *-[C₆H₄]-S(O)₂-N(CH₂CH₂OH)₂ |
| C9 | *-[C₆H₄]-O(EO)₁₀H |

Test 2: Determination of Molar Absorptivity of Bis-Azo Colorants

The molar absorptivity ($\epsilon$) of each example is provided in Table 2.

TABLE 2

Molar Absorptivity of Bis-Azo Colorants

| Example No. | Molar Abs ($\epsilon$) |
|---|---|
| Example 1 | 28615 |
| Example 2 | 12399 |
| Example 3 | 23657 |
| Example 4 | 26346 |
| Example 5 | 43706 |
| Example 6 | 21877 |
| Example 7 | 27436 |
| Example 8 | 16620 |
| Example 9 | 34649 |
| Example 10 | 15103 |
| Example 11 | 25427 |
| Example 12 | 8347 |
| Example 13 | 11223 |
| Example 14 | 23691 |
| Example 15 | 28205 |
| Example 16 | 32492 |
| Example 17 | 21645 |
| Example 18 | 34180 |
| Example 19 | 35408 |

Test 3: Determination of Deposition and Hue Angle

Table 3 provides the deposition and hue angle for Examples 1-19. The data is sorted by variation in Components A, B and C, as determined previously.

TABLE 3

Deposition and Hue Angle of Bis-Azo Colorants

| | Sample No. | Components A | B | C | Deposition Abs$^{\Delta b\,-2}$ | Absolute Hue Angle $\theta_A$ | Relative Hue Angle $\theta_R$ |
|---|---|---|---|---|---|---|---|
| Variation in A | Example 14 | 1 | 1 | 1 | 0.0778 | 274.9 | 256.0 |
| | Example 15 | 2 | 1 | 1 | 0.0584 | 277.2 | 275.7 |
| | Example 16 | 3 | 1 | 1 | 0.0436 | 282.9 | 315.0 |
| | Example 1 | 1 | 1 | 4 | 0.0463 | 274.2 | 250.7 |
| | Example 3 | 2 | 1 | 4 | 0.0170 | 277.2 | 275.7 |
| | Example 4 | 3 | 1 | 4 | 0.0341 | 286.2 | 327.2 |
| | Example 19 | 1 | 1 | 7 | 0.0375 | 273.9 | 248.2 |
| | Example 17 | 2 | 1 | 7 | 0.0245 | 275.7 | 262.9 |
| | Example 18 | 3 | 1 | 7 | 0.0181 | 279.4 | 294.2 |
| | Example 2 | 1 | 2 | 4 | 0.0345 | 273.6 | 245.8 |
| | Example 5 | 3 | 2 | 4 | 0.0140 | 276.8 | 272.9 |
| Variation in B | Example 9 | 1 | 1 | 2 | 0.0562 | 274.9 | 256.0 |
| | Example 10 | 1 | 2 | 2 | 0.1223 | 274.6 | 253.3 |
| | Example 1 | 1 | 1 | 4 | 0.0463 | 274.2 | 250.7 |
| | Example 2 | 1 | 2 | 4 | 0.0345 | 273.6 | 245.8 |
| | Example 6 | 1 | 1 | 5 | 0.0209 | 274.9 | 256.0 |
| | Example 7 | 1 | 2 | 5 | 0.0255 | 272.9 | 241.2 |
| | Example 4 | 3 | 1 | 4 | 0.0341 | 286.2 | 327.2 |
| | Example 5 | 3 | 2 | 4 | 0.0140 | 276.8 | 272.9 |
| Variation in C | Example 14 | 1 | 1 | 1 | 0.0778 | 274.9 | 256.0 |
| | Example 14 | | | | 0.0748 | 274.9 | 256.0 |
| | Example 9 | 1 | 1 | 2 | 0.0562 | 274.9 | 256.0 |
| | Example 1 | 1 | 1 | 4 | 0.0463 | 274.2 | 250.7 |
| | Example 6 | 1 | 1 | 5 | 0.0209 | 274.9 | 256.0 |
| | Example 19 | 1 | 1 | 7 | 0.0375 | 273.9 | 248.2 |
| | Example 10 | 1 | 2 | 2 | 0.1223 | 274.6 | 253.3 |
| | Example 8 | 1 | 2 | 3 | 0.0925 | 272.3 | 237.0 |
| | Example 2 | 1 | 2 | 4 | 0.0345 | 273.6 | 245.8 |
| | Example 7 | 1 | 2 | 5 | 0.0255 | 272.9 | 241.2 |
| | Example 12 | 1 | 2 | 6 | 0.0347 | 274.2 | 250.7 |

TABLE 3-continued

Deposition and Hue Angle of Bis-Azo Colorants

| Sample No. | Components A | B | C | Deposition Abs$^{\Delta b\,-2}$ | Absolute Hue Angle $\theta_A$ | Relative Hue Angle $\theta_R$ |
|---|---|---|---|---|---|---|
| Example 13 | 1 | 2 | 8 | 0.0409 | 272.0 | 235.0 |
| Example 11 | 1 | 2 | 9 | 0.0905 | 274.9 | 256.0 |
| Example 15 | 2 | 1 | 1 | 0.0584 | 277.2 | 275.7 |
| Example 3 | 2 | 1 | 4 | 0.0170 | 277.2 | 275.7 |
| Example 3 | | | | 0.0168 | 275.9 | 264.3 |
| Example 17 | 2 | 1 | 7 | 0.0245 | 275.7 | 262.9 |
| Example 16 | 3 | 1 | 1 | 0.0436 | 282.9 | 315.0 |
| Example 4 | 3 | 1 | 4 | 0.0341 | 286.2 | 327.2 |
| Example 18 | 3 | 1 | 7 | 0.0181 | 279.4 | 294.2 |

With respect to the data contained in Table 3, absolute hue angle describes the actual hue angle of the fabric on the a*, b* plane. This is the angle that a consumer actually sees when looking at the fabric. Relative hue angle is determined against a tracer fabric washed in nil-dye HDL (i.e. same detergent, but without dye), and thus gives the movement within the a*, b* plane relative to the nil-dye control.

Thus, the bluing agent of the present invention may have an absolute hue angle in the range of 265° to 310°, 265° to 300°, 265° to 295°, 270° to 295°, 270° to 290°, or even in the range of 273° to 287°.

Exemplary Detergent Formulations

Formulations 1a-1l

Liquid Detergent Formulations

Tables 4A and 4B provide examples of liquid detergent formulations which include at least one bluing agent of the present invention. The formulations are shown in Table 4A as Formulations 1a through 1f and in Table 4B as Formulations 1g through 1l.

TABLE 4A

Liquid Detergent Formulations Comprising the Inventive Bluing Agent

| Ingredient | 1a wt % | 1b wt % | 1c wt % | 1d wt % | 1e wt % | 1f[5] wt % |
|---|---|---|---|---|---|---|
| sodium alkyl ether sulfate | 14.4% | 14.4% | | 9.2% | 5.4% | |
| linear alkylbenzene sulfonic acid | 4.4% | 4.4% | 12.2% | 5.7% | 1.3% | 22.0% |
| alkyl ethoxylate | 2.2% | 2.2% | 8.8% | 8.1% | 3.4% | 18.0% |
| amine oxide | 0.7% | 0.7% | 1.5% | | | |
| citric acid | 2.0% | 2.0% | 3.4% | 1.9% | 1.0% | 1.6% |
| fatty acid | 3.0% | 3.0% | 8.3% | | | 16.0% |
| protease | 1.0% | 1.0% | 0.7% | 1.0% | | 2.5% |
| amylase | 0.2% | 0.2% | 0.2% | | | 0.3% |
| lipase | | | | 0.2% | | |
| borax | 1.5% | 1.5% | 2.4% | 2.9% | | |
| calcium and sodium formate | 0.2% | 0.2% | | | | |
| formic acid | | | | | | 1.1% |
| amine ethoxylate polymers | 1.8% | 1.8% | 2.1% | | | 3.2% |
| sodium polyacrylate | | | | | 0.2% | |
| sodium polyacrylate copolymer | | | | 0.6% | | |
| DTPA[1] | 0.1% | 0.1% | | | | 0.9% |
| DTPMP[2] | | | 0.3% | | | |
| EDTA[3] | | | | | 0.1% | |
| fluorescent whitening agent | 0.15% | 0.15% | 0.2% | 0.12% | 0.12% | 0.2% |
| ethanol | 2.5% | 2.5% | 1.4% | 1.5% | | |
| propanediol | 6.6% | 6.6% | 4.9% | 4.0% | | 15.7% |
| sorbitol | | | | 4.0% | | |
| ethanolamine | 1.5% | 1.5% | 0.8% | 0.1% | | 11.0% |
| sodium hydroxide | 3.0% | 3.0% | 4.9% | 1.9% | 1.0% | |

TABLE 4A-continued

Liquid Detergent Formulations Comprising the Inventive Bluing Agent

| Ingredient | 1a wt % | 1b wt % | 1c wt % | 1d wt % | 1e wt % | 1f[5] wt % |
|---|---|---|---|---|---|---|
| sodium cumene sulfonate | | | 2.0% | | | |
| silicone suds suppressor | | | 0.01% | | | |
| perfume | 0.3% | 0.3% | 0.7% | 0.3% | 0.4% | 0.6% |
| Non-tinting dyes[4] | 0.0001% | 0.001% | 0.008% | 0.03% | 0.015% | 0.05% |
| First bis-azo colorant[6] | | 0.001% | 0.001% | | 0.0005% | |
| Second bis-azo colorant[6] | 0.013% | | 0.005% | 0.003% | | 0.001% |
| water | balance | balance | balance | balance | balance | balance |
| | 100.0% | 100.0% | 100.0% | 100.0% | 100.0% | 100.0% |

TABLE 4B

Liquid Detergent Formulations Comprising the Inventive Bluing Agent

| Ingredient | 1g wt % | 1h wt % | 1i wt % | 1j wt % | 1k wt % | 1l[5] wt % |
|---|---|---|---|---|---|---|
| sodium alkyl ether sulfate | 14.4% | 14.4% | | 9.2% | 5.4% | |
| linear alkylbenzene sulfonic acid | 4.4% | 4.4% | 12.2% | 5.7% | 1.3% | 22.0% |
| alkyl ethoxylate | 2.2% | 2.2% | 8.8% | 8.1% | 3.4% | 18.0% |
| amine oxide | 0.7% | 0.7% | 1.5% | | | |
| citric acid | 2.0% | 2.0% | 3.4% | 1.9% | 1.0% | 1.6% |
| fatty acid | 3.0% | 3.0% | 8.3% | | | 16.0% |
| protease | 1.0% | 1.0% | 0.7% | 1.0% | | 1.7% |
| amylase | 0.2% | 0.2% | 0.2% | | | 0.6% |
| lipase | | | | 0.2% | | 0.2% |
| borax | 1.5% | 1.5% | 2.4% | 2.9% | | |
| calcium and sodium formate | 0.2% | 0.2% | | | | |
| formic acid | | | | | | 1.1% |
| amine ethoxylate polymers | 1.8% | 1.8% | 2.1% | | | 3.2% |
| sodium polyacrylate | | | | | 0.2% | |
| sodium polyacrylate copolymer | | | | 0.6% | | |
| DTPA[1] | 0.1% | 0.1% | | | | 0.9% |
| DTPMP[2] | | | 0.3% | | | |
| EDTA[3] | | | | | 0.1% | |
| fluorescent whitening agent | 0.15% | 0.15% | 0.2% | 0.12% | 0.12% | 0.2% |
| ethanol | 2.5% | 2.5% | 1.4% | 1.5% | | |
| propanediol | 6.6% | 6.6% | 4.9% | 4.0% | | 15.7% |
| sorbitol | | | | 4.0% | | |
| ethanolamine | 1.5% | 1.5% | 0.8% | 0.1% | | 11.0% |
| sodium hydroxide | 3.0% | 3.0% | 4.9% | 1.9% | 1.0% | |
| sodium cumene sulfonate | | | 2.0% | | | |
| silicone suds suppressor | | | 0.01% | | | |
| perfume | 0.3% | 0.3% | 0.7% | 0.3% | 0.4% | 0.6% |
| Non-tinting dyes[4] | 0.0001% | 0.001% | 0.008% | 0.03% | 0.015% | 0.05% |
| First bis-azo colorant[6] | 0.01% | | 0.005% | | 0.005% | |
| Second bis-azo colorant[6] | | 0.01% | 0.02% | 0.003% | | 0.012% |
| opacifier[7] | | 0.5% | | | | |
| water | balance | balance | balance | balance | balance | balance |
| | 100.0% | 100.0% | 100.0% | 100.0% | 100.0% | 100.0% |

Footnotes for Formulations 1a-I:

[1] diethylenetriaminepentaacetic acid, sodium salt
[2] diethylenetriaminepentakismethylenephosphonic acid, sodium salt
[3] ethylenediaminetetraacetic acid, sodium salt
[4] a non-tinting dye or mixture of non-tinting dyes used to adjust formula color
[5] compact formula, packaged as a unitized dose in polyvinyl alcohol film
[6] Bis-azo colorants selected from Examples 1-19, preferably with hueing efficiency >10 and wash removability 30-85%
[7] Acusol OP301

Formulations 2a-2e

Granular Detergent Formulations

Table 5 provides examples of granular detergent formulations which include at least one bluing agent of the present invention. The formulations are shown in Table 5 as Formulations 2a through 2e.

TABLE 5

Granular Detergent Formulations Comprising the Inventive Bluing Agent

| Ingredient | 2a wt % | 2b wt % | 2c wt % | 2d wt % | 2e wt % |
|---|---|---|---|---|---|
| Na linear alkylbenzene sulfonate | 3.4% | 3.3% | 11.0% | 3.4% | 3.3% |
| Na alkylsulfate | 4.0% | 4.1% |  | 4.0% | 4.1% |
| Na alkyl sulfate (branched) | 9.4% | 9.6% |  | 9.4% | 9.6% |
| alkyl ethoxylate |  |  | 3.5% |  |  |
| type A zeolite | 37.4% | 35.4% | 26.8% | 37.4% | 35.4% |
| sodium carbonate | 22.3% | 22.5% | 35.9% | 22.3% | 22.5% |
| sodium sulfate | 1.0% |  | 18.8% | 1.0% |  |
| sodium silicate |  |  | 2.2% |  |  |
| protease | 0.1% | 0.2% |  | 0.1% | 0.2% |
| sodium polyacrylate | 1.0% | 1.2% | 0.7% | 1.0% | 1.2% |
| carboxymethylcellulose |  |  | 0.1% |  |  |
| PEG 600 |  | 0.5% |  |  | 0.5% |
| PEG 4000 |  | 2.2% |  |  | 2.2% |
| DTPA | 0.7% | 0.6% |  | 0.7% | 0.6% |
| fluorescent whitening agent | 0.1% | 0.1% | 0.1% | 0.1% | 0.1% |
| sodium percarbonate |  | 5.0% |  |  | 5.0% |
| sodium nonanoyloxybenzenesulfonate |  | 5.3% |  |  | 5.3% |
| silicone suds suppressor | 0.02% | 0.02% |  | 0.02% | 0.02% |
| perfume | 0.3% | 0.3% | 0.2% | 0.3% | 0.3% |
| First bis-azo colorant[1] | 0.004% |  | 0.001% |  | 0.02% |
| Second bis-azo colorant[1] |  | 0.006% | 0.002% | 0.004% |  |
| water and miscellaneous | balance | balance | Balance | balance | balance |
|  | 100.0% | 100.0% | 100.0% | 100.0% | 100.0% |

[1]Bis-azo colorants selected from Examples 1-19, preferably with hueing efficiency >10 and wash removability of 30-85%.

Exemplary Fabric Care Compositions

Formulations 3a-3d

Liquid Fabric Care Compositions

Table 6 provides examples of liquid fabric care compositions which include at least one bluing agent of the present invention. The compositions are shown in Table 6 as Formulations 3a through 3d.

TABLE 6

Liquid Fabric Care Compositions Comprising the Inventive Bluing Agent

| Ingredients | 3a | 3b | 3c | 3d |
|---|---|---|---|---|
| Fabric Softening Active[a] | 13.70% | 13.70% | 13.70% | 13.70% |
| Ethanol | 2.14% | 2.14% | 2.14% | 2.14% |
| Cationic Starch[b] | 2.17% | 2.17% | 2.17% | 2.17% |
| Perfume | 1.45% | 1.45% | 1.45% | 1.45% |
| Phase Stabilizing Polymer[c] | 0.21% | 0.21% | 0.21% | 0.21% |
| Calcium Chloride | 0.147% | 0.147% | 0.147% | 0.147% |
| DTPA[d] | 0.007% | 0.007% | 0.007% | 0.007% |
| Preservative[e] | 5 ppm | 5 ppm | 5 ppm | 5 ppm |
| Antifoam[f] | 0.015% | 0.015% | 0.015% | 0.015% |
| First bis-azo colorant[i] | 30 ppm |  |  | 15 ppm |
| Second bis-azo colorant[i] |  | 30 ppm |  |  |
| Third bis-azo colorant[i] |  |  | 30 ppm | 15 ppm |
| Tinopal CBS-X[g] | 0.2 | 0.2 | 0.2 | 0.2 |
| Ethoquad C/25[h] | 0.26 | 0.26 | 0.26 | 0.26 |
| Ammonium Chloride | 0.1% | 0.1% | 0.1% | 0.1% |
| Hydrochloric Acid | 0.012% | 0.012% | 0.012% | 0.012% |
| Deionized Water | Balance | Balance | Balance | Balance |

[a]N,N-di(tallowoyloxyethyl)-N,N-dimethylammonium chloride.
[b]Cationic starch based on common maize starch or potato starch, containing 25% to 95% amylose and a degree of substitution of from 0.02 to 0.09, and having a viscosity measured as Water Fluidity having a value from 50 to 84.
[c]Copolymer of ethylene oxide and terephthalate having the formula described in U.S. Pat. No. 5,574,179 at col. 15, lines 1-5, wherein each X is methyl, each n is 40, u is 4, each $R^1$ is essentially 1,4-phenylene moieties, each $R^2$ is essentially ethylene, 1,2-propylene moieties, or mixtures thereof.
[d]Diethylenetriaminepentaacetic acid.
[e]KATHON ® CG available from Rohm and Haas Co.
[f]Silicone antifoam agent available from Dow Corning Corp. under the trade name DC2310.
[g]Disodium 4,4'-bis-(2-sulfostyryl) biphenyl, available from Ciba Specialty Chemicals.
[h]Cocomethyl ethoxylated [15] ammonium chloride, available from Akzo Nobel.
[i]Bis-azo colorants selected from Examples 1-19, preferably with hueing efficiency >10 and wash removability of 30-85%.

Accordingly, the present invention provides a bluing agent for textile and/or paper substrates comprising at least one chromophore component that comprises a bis-azo colorant and at least one polymeric component. A laundry detergent composition and a rinse added fabric softener containing such a bluing agent is also contemplated herein.

While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A bluing agent wherein the bluing agent has the following structure:

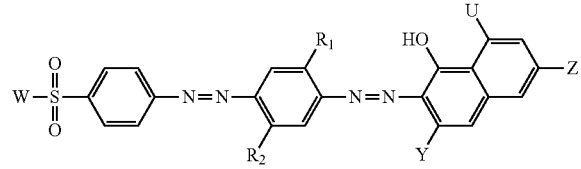

wherein:
- $R_1$ and $R_2$ are independently H, alkyl, alkoxy, alkyleneoxy, alkyl capped alkyleneoxy, polyalkyleneoxy, alkyl capped polyalkyleneoxy, or amido;
- W is a substituted amino moiety, wherein the substituent is a polyalkyleneoxy moiety;
- U is a hydrogen, an amino group or an amino group substituted with an acyl group;
- Y is a hydrogen or a sulfonic acid moiety; and
- Z is a sulfonic acid moiety or an amino group substituted with a phenyl group.

2. The bluing agent of claim 1, wherein $R_1$ is alkoxy and $R_2$ is alkyl.

3. The bluing agent of claim 1, wherein the bluing agent comprises a polyalkyleneoxy moiety having from 2 to about 30 repeating units.

4. The bluing agent of claim 1, wherein the bluing agent comprises a polyalkyleneoxy moiety having from 2 to about 20 repeating units.

5. The bluing agent of claim 1, wherein the bluing agent comprises a polyalkyleneoxy moiety having from 2 to about 10 repeating units.

* * * * *